United States Patent
Huang et al.

(10) Patent No.: US 11,609,317 B2
(45) Date of Patent: Mar. 21, 2023

(54) TWO DIMENSION AND THREE DIMENSION IMAGING BASED ON SPEED CHANGES OF SOUND/ULTRASOUND

(71) Applicants: Hai Huang, Herndon, VA (US); Tony Huang, Herndon, VA (US)

(72) Inventors: Hai Huang, Herndon, VA (US); Tony Huang, Herndon, VA (US)

(73) Assignees: Hai Huang, Herndon, VA (US); Tony Huang, Herndon, VA (US)

( * ) Notice: Subject to any disclaimer, the term of this patent is extended or adjusted under 35 U.S.C. 154(b) by 67 days.

(21) Appl. No.: 17/388,175

(22) Filed: Jul. 29, 2021

(65) Prior Publication Data

US 2021/0356573 A1 Nov. 18, 2021

Related U.S. Application Data

(63) Continuation of application No. 15/613,308, filed on Jun. 5, 2017, now Pat. No. 10,324,174, and a continuation of application No. 14/645,475, filed on Mar. 12, 2015, now Pat. No. 9,880,272.

(51) Int. Cl.
*G01S 7/523* (2006.01)
*G01S 15/89* (2006.01)
*G01S 15/02* (2006.01)
*G01S 15/58* (2006.01)

(52) U.S. Cl.
CPC .............. *G01S 7/523* (2013.01); *G01S 15/02* (2013.01); *G01S 15/58* (2013.01); *G01S 15/8986* (2013.01)

(58) Field of Classification Search
USPC ........................................... 367/89
See application file for complete search history.

(56) References Cited

U.S. PATENT DOCUMENTS

| | | | | |
|---|---|---|---|---|
| 5,877,997 A | * | 3/1999 | Fell | ............ G01S 7/52006 367/908 |
| 2006/0064015 A1 | * | 3/2006 | Davies | ........... G01S 7/52028 600/447 |
| 2012/0266676 A1 | * | 10/2012 | Mueller | ............... G01F 1/66 73/632 |

* cited by examiner

*Primary Examiner* — Daniel L Murphy
*Assistant Examiner* — Amie M Ndure

(57) ABSTRACT

The invention is based on speed changes of sound/ultrasound pulses and a fixed detecting depth between a transducer and sampling points to collect information of the detecting depth and/or a velocity of motionless and/or moving objects from the sampling points to construct two-dimension or three-dimension images of the sampling points. By taking advantages of a pulse ultrasound and a continuous ultrasound, a method of coded sound pulses can simultaneously collect the information of the detecting depth and the velocity from the sampling points, which improves imaging quality. Calculating a speed of the moving objects by simultaneously detecting time-of-flight (TOF) and TOF shift at same site from two separated piezoelectric (PZT) elements improves testing results with accuracy, simplification and reproducibility. An aliasing can be rectified based on the TOF and the TOF shift.

18 Claims, 17 Drawing Sheets

TWO DIMENSION AND THREE DIMENSION IMAGING BASED ON SPEED CHANGES OF SOUND/ULTRASOUND

CROSS-REFERENCES TO RELATED APPLICATIONS

This application claims priority to U.S. patent application Ser. No. 14/645,475 filed on Mar. 12, 2015, and U.S. patent application Ser. No. 15/613,308 filed on Jun. 5, 2017, the entire contents of all of which are incorporated herein by reference.

FIELD OF THE DISCLOSURE

The present disclosure generally relates to the field of sound technology and, more particularly, relates to a method for calculation of a detecting depth and a velocity of motionless and/or moving objects based on speed changes of sound/ultrasound.

BACKGROUND

Formation of waves is a kind of energy transformation between kinetic and potential energy, which spreads between an interface of two kinds of fluid transmitting mediums with different densities, such as formation of water waves due to different densities between water and air. So, within just one transmitting medium without density differences, sound should move as a kind energy of a pulse. Transmission of sound pulses is actually energy traveling of acoustic pulses in transmitting medium. If there is acoustic impedance during the transmission of the sound pulses, the acoustic impedance will resist the movement of the sound pulses and consume its energy. Currently, it is supposed that the sound is transmitted as waves and a sound speed is identical in the same medium during the transmission. But, in the invention, the sound is transmitted as pulses and the speed of the sound pulses is considered as gradually reduced during the transmission due to the acoustic impedance of the transmitting medium, which gradually depletes the energy of the sound pulses. So, the question is how the sound can form waves within just one transmitting medium without the density differences and if the speed of the sound pulses can still keep identical as currently supposed when its energy is gradually reduced until exhausted? If the speed of the sound pulses is gradually reduced during transmission, a detecting depth will be wrong based on calculating the detecting depth with the identical sound speed.

Current sound theory correlates frequencies of the sound waves with their detecting depth, with lower frequency of the sound waves having a deeper detecting depth. But, a thin piezoelectric element (PZT) can make a high frequency of the sound as well as a low frequency of the sound, which means the sound waves with different frequencies sending from the same PZT element have the same level of energy. So, the question is what are main factors that actually affect the detecting depth of the sound?

Currently Doppler mechanism calculates a velocity of a moving object based on the identical sound speed and changed detecting distance between a targeted moving object and a detector. According Doppler theory, it is currently considered that a forward moving object can compress frequencies of the sound waves and reversely moving object decompress the frequencies of the sound waves due to the change of distance between the targeted moving object and the detector. So, Doppler mechanism has been widely used to measure velocities of moving objects based on frequency shift, such as medical sound machine and Doppler radar. But, for the pulsed wave ultrasound, setting a gate location fixes a distance between the detector and sampling points for different moving objects that pass the sampling points, which cannot explain the effect of Doppler mechanism. For the pulsed wave ultrasound, aliasing is explained with insufficient Doppler sampling rate of the frequency domain analysis. But, the theory of the frequency domain can not completely solve the aliasing problem of the pulsed wave ultrasound and color ultrasound.

Thus, there is a need to overcome above problems to provide methods for more accurately calculating the detecting depth of sound pulses, correctly calculating the speed of the moving objects and rectifying the aliasing for the pulsed wave and the color ultrasound.

BRIEF SUMMARY OF THE DISCLOSURE

One aspect of the invention is calculating a detecting depth of sampling points based on speed changes of the sound pulses, which can rectify a compromised detecting depth based on an identical sound speed. As the result, the sound imaging quality will be improved.

Sound transmits in transmitting medium as a form of a sound pulse. The sound pulse contains its length, density and speed, which decide its intensity and traveling distance. A thickness and density of piezoelectric (PZT) elements decide the length and density of sound pulses, which affect their detecting depth. When the frequencies of the sound pulses excess more than 20 kilohertz, which limits a length of the sound pulses and creates a sound intensity below a hearing threshold of most of people. So, ultrasound belongs to the sound with very low intensity of the sound pulses that most of people can not hear the sound. As a kind of energy traveling in the transmitting medium, a speed of the sound pulses will gradually reduce due to acoustic impedance, which resists movement of the sound pulses and consumes energy of the sound pulses. But current sound theories and applications are based on the identical speed in the same transmitting medium. Calculating of the detecting depth of the sound pulses based on the identical speed of the sound pulses will compromise the detecting depth due to the speed of the sound pulses is gradually reduced during the transmission of the sound pulses.

Another aspect of the invention is detecting a velocity of moving objects based on the speed changes of the sound pulses and a fixed detecting distance between a detector and sampling points for a continuous, a pulsed and a color ultrasound. So, the invention is different from Doppler mechanism, which is based on the identical sound speed and a changed detecting distance between a detector and a targeted moving object.

The moving objects can change the speed of reflected sound pulses, which change time-of-flight (TOF) and the TOF shift of the sound pulses. No matter in the continuous or the pulsed or the color ultrasound, when checking the velocity of blood flow, a sound imaging system always detects the reflected sound pulses from the fixed sampling points where sound beam cross with blood vessels to calculate the TOF shift. So, the speed of the moving objects can be calculated based on the TOF shift. An angle between the sound beam and a direction of the moving objects affects the value of the TOF shift. Calculating the speed of the moving objects by simultaneously detecting the TOF shift from two separated PZT elements from same sampling point avoids the effect of tortuous blood vessels and variant performances of sonographers, which improves the testing results with accuracy, simplification and reproducibility.

In the invention, a ratio (Rt) of the TOF shift to a calculated TOF can be used to completely correct an aliasing for the pulsed and the color ultrasound no matter how fast the speed of the moving objects will be. A calculated TOF is calculated based on an average speed of the sound pulses in the transmitting medium and the detecting depth between a transducer and a gate. An aliasing limit of the Rt is 0.5. If the speed of the moving objects is too fast and the Rt is greater than 0.5, the sound imaging system will misinterpret the Rt and generate an aliasing Rt. For the forward moving objects, the Rt is positive value. If the Rt excesses its aliasing limit, the sound imaging system will decrease 1 from the Rt to make an aliasing Rt. The aliasing Rt becomes negative value and below the baseline, which represents the moving objects toward reverse direction. For reversely moving objects, the Rt is negative value. If the Rt excesses its aliasing limits, the sound imaging system will increase 1 from the Rt to make the aliasing Rt. The aliasing Rt becomes positive value and above the baseline, which represents the moving objects from forward direction.

So, in the invention, a computer program is designed to identify and correct the aliasing Rt. Identifying and correcting the aliasing Rt can also be used to differentiate the colors of aliasing from the colors of the turbulent flow, which benefits clinical judgment and diagnosis.

Another aspect of the invention is using coded sound pulses to construct two-dimension (2D) images and three-dimension (3D) images, which take advantages of the continuous ultrasound and the pulsed ultrasound to improve imaging quality.

Because the continuous ultrasound doesn't contain information of the detecting depth and the pulsed ultrasound may generate the aliasing. In the invention, the coded sound pulses can simultaneously obtain information of the detecting depth (y) and the velocity (v) from the sampling points and avoid the aliasing. Therefore a 2D dataset of (x, y, v) collecting from the sample points can be used to construct 2D images for motionless and/or moving objects from the sample points. The x represents a location of the PZT elements in the transducer.

Furthermore by collecting a plurality of succession of 2D dataset, a 3D dataset (x, y, z, v) can be obtained to construct 3D images for the sampling points of motionless/moving objects. The z represents a position of the sampling points in a volumetric image array. Compound 3D images with the sampling points of motionless and moving objects or 3D images just with the sampling points of the moving objects can be constructed to present volumetric information of vessels with characters of the velocity of the moving objects within the vessels.

The coded sound pulses can be used to improve the sound imaging quality by rectifying wrong received codes of the pulse characters from duplicately reflected sound pulses in a mirror image or refracted sound pulses, and deleting non-coded background signals. At the same time, the coded sound pulses can also increase temporal resolution to improve the quality of the 2D and the 3D images Based on the speed reduction of the sound pulses during the transmission, the intensity of the sound pulses, the TOF, and the TOF shift can more accurately correlate with the detecting depth and the velocity of the moving objects than the results based on the identical sound speed and Doppler mechanism. Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
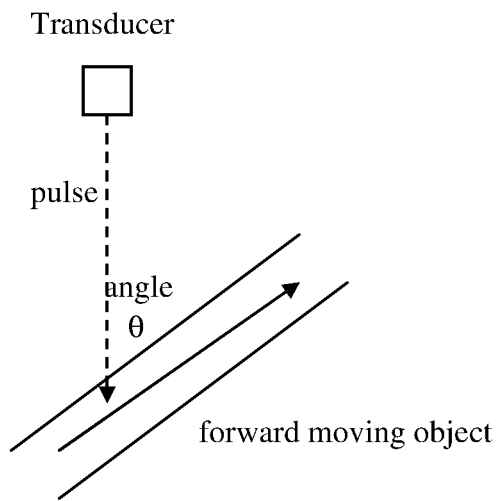
FIG. 1 is a schematic illustration of a rebound force shift of forward moving objects to sound pulses from a fixed sampling point.
Figure 1:
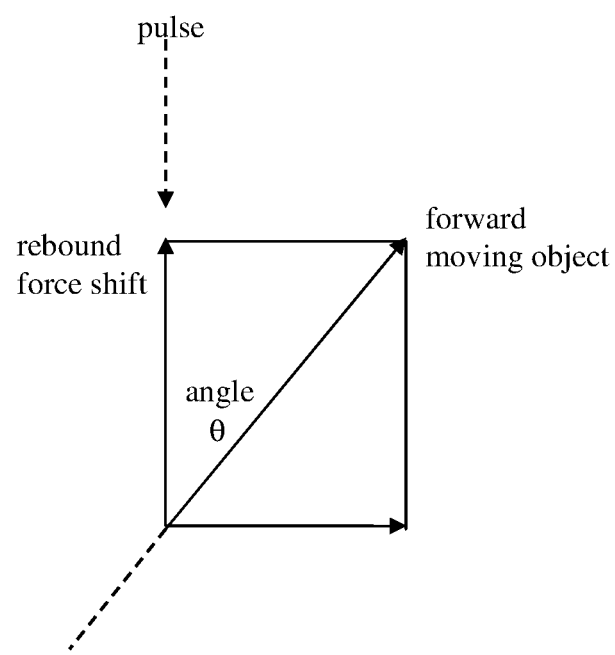

Reference will now be made in detail to exemplary embodiments of the disclosure, which are illustrated in the accompanying drawings. Wherever possible, the same reference numbers will be used throughout the drawings to refer to the same or like parts.

Speed of Sound Pulses Reduces During Transmission

Formation of waves is a king of energy transformation between gravitational energy and kinetic energy as the waves are transferred along an interface of two kinds of fluid materials with different densities, such as formation of water waves due to different densities between water and air. At the same time, a speed of the waves also keeps changes during the energy transformation between the gravitational energy and the kinetic energy. Transmitting the energy just within one transmitting medium without density difference, a sound energy should be transferred as a form of a sound pulse. So, in the invention, continuous ultrasound and pulsed ultrasound are referred as current continuous wave or pulsed wave ultrasound. A sound pulse includes its length, density and speed, which form a sound intensity. The length and density of the sound pulse is related to a thickness and a density of materials that create the sound. The thicker the materials give a longer sound pulse, which is like different sounds from different chords of a violin or a piano. The density of the sound pulse is related to the density of the materials that create the sound pulse. The higher density the materials are, the greater density the sound pulse will be, such as the sound difference launched from wood or metal. The sound speed is also changed, such as different sound strength when hitting a key of a piano with different forces. Hitting the key more strongly will bring louder sound, which is related to a faster sound speed with a higher sound intensity. So, the intensity of the sound pulse is the multiplication value of its length, density and speed, which is correlated to a sound pressure. A sound pulse with greater intensity will travel further, and the speed of the sound pulse will gradually reduce due to the acoustic impedance of transmitting medium, which gradually depletes the energy of the sound.

Sound intensity (kg/MS)=sound length (M)×sound density (Kg/M$^3$)×sound speed (M/S)

Sound intensity=acoustic impedance×traveling distance

M=meter; Kg=kilogram; S=second

Piezoelectric (PZT) elements can generate piezoelectric effect. The PZT elements in a transducer of a sound imaging system emit sound pulses with their intensity, which is related to the length, the density, and the speed of the sound pulses. Nowadays, the speed of the sound pulses with different frequencies is considered as identical in the same transmitting medium. But, actually the speed of the sound pulses should not be identical as currently supposed during the transmission, and it will gradually reduce due to the acoustic impedance of the transmitting medium. As bullets shooting from a machine gun, their speed is gradually reduced due to loss of their energy caused by resistance of air. But, frequency of the bullets at any sites of trajectory may be kept the same. The transmission of the sound pulses has the similar mechanism. The acoustic impedance is decided by a density of the transmitting medium. A power of electric output on PZT elements decides a maximal speed of the sound pulses that enter the transmitting medium. During the transmission, the speed of the sound pulses gradually reduces due to the loss of their energy caused by the acoustic impedance, which will finally exhaust the energy of the sound pulses. But, the Sound pulses keep the same frequency during the transmission, including their reflected frequency. A rate of the speed change of the sound pulses is related to the density of the transmitting medium, and the length and the density of the sound pulses. So, a speed reducing coefficient can be used to express their relationship with the speed changes of the sound pulses.

Calculation of a Detecting Depth Based on Speed Changes of Sound Pulses

One aspect of the invention is calculation of a detecting depth of the sound pulses from sampling points based on a speed reduction of the sound pulses during the transmission, which can rectify a compromised detecting depth of the sound pulses based on currently identical speed of the sound pulses.

Nowadays, calculating the detecting depth is based on an identical speed of the sound pulses in the transmitting medium, which may miscalculate the detecting depth due to various intensity affecting factors of the sound pulses. As the sound pulses leave the PZT elements and enter the transmitting medium, the speed of the sound pulses is at their maximal speed. Then, under effect of the acoustic impedance, the speed of the sound pulses will gradually reduce during the transmitting process. The longer the sound pulses travel, the slower the speed of the sound pulses will be. As a result, if calculated with the identical speed of the sound pulses, the detecting depths calculated from proximal sampling points are shortened than actual depth of the sampling points because of a faster speed of the sound pulses traveling a longer distance within a certain time period, which compresses a distance between the sampling points in sound images; and the depths calculated from distal sampling points are longer than the actual depth of the sampling points due to a slower speed of the sound pulses traveling a shorter distance within the certain time period, which elongates the distance of the sampling point in the sound images. As the result, an uncorrected detecting depth of the sampling points degrades the quality of the sound images. In order to correctly calculate the detecting depth of the sound pulses, a speed reducing coefficient of the sound pulses can be used to compensate a speed reduction of the sound pulses during the transmission. The speed reducing coefficient (Coef) is directly proportional to the density of the transmitting medium and constant k, and inversely proportional to the density and the thickness of the PZT elements, which are correlated to the length and the density of the sound pulses. The constant k is related to acoustic characteristics of the transmitting medium. $V_m$ is a maximal speed of the sound pulses as they just enter a transmitting medium from the PZT elements. Time of flight (TOF) is a traveling time of the sound pulses between emitted sound pulses and reflected sound pulses. Because of the speed reduction of the sound pulses during the transmission, a traveling time (TOFa) from the PZT elements to the sampling points of the emitted sound pulses is less than a traveling time of the reflected sound pulses from the sampling points returning to the PZT elements. $V_{avg}$ is an average speed of the emitted sound pulses from the PZT elements to the sampling points, and the $V_{avg}$ is variable due to different detecting depths of the sampling points and the speed reduction of the sound pulses. Increasing the detecting depth will reduce the $V_{avg}$. The detecting depth between the PZT elements and the sampling points is a value of multiplication result of the $V_{avg}$ and the TOFa.

$$Coef = \frac{k \times \text{medium density}}{PZT \text{ density} \times PZT \text{ thickness}}$$

$$TOFa = \frac{TOF \times (1 - Coef)}{2 - Coef}$$

-continued $$V_{avg} = V_m \times (1 - Coef \times TOFa)$$

$$\text{Detecting depth} = V_{avg} \times TOFa$$

So, multiple speed affecting factors, such as the medium density, the PZT density, the PZT thickness, the Vm and the TOFa, are involved in calculating the detecting depth. So, it is more accurate than a compromised detecting depth of the sampling points calculated based on an identical speed of the sound pulses and the TOF, which improves imaging quality.

Optimizing Imaging Quality with Compound PZT Elements

As a power transferred per unit area, the intensity of the sound pulses equals the multiplication value of the length, the density and the speed of the sound pulses. The length of the sound pulses is related to the thickness of the PZT elements and the density of the sound pulses is related to the density of the PZT elements and the speed of the sound pulses is related to the power of electric output. So, increasing one or more of the thickness and the density of PZT elements and the power of the electric output on the PZT elements will increases the intensity of the sound pulses, which increase their detecting depth.

A thickness of the PZT elements decides the detecting depth. A thinner PZT element has better axial resolution but a shorter detecting depth; and a thicker PZT element has a deeper detecting depth but worse axial resolution. So, arranging the PZT elements with different PZT thicknesses in a transducer can optimize the detecting depth for each PZT elements. Thin PZT elements focus on proximal sampling points and thick PZT elements focus on distal sampling points, which will improve the imaging quality.

Improving Axial Resolution of Sound Imaging by Decreasing a Length of the Sound Pulses Currently increasing frequency of the sound pulses is used to increase axial resolution. Actually, the axial resolution is decided by a length of the sound pulses, which is related to the thickness of the PZT elements. But, the frequency of the sound pulses is not directly related to the axial resolution of the sound pulses, because the thin PZT elements can generate high frequency as well as low frequency of the sound pulses. Less thickness of the PZT elements generates shorter sound pulses and smaller numerical values of spatial pulse length, which increases the axial resolution to improve imaging quality.

At the same time, the thickness of the PZT elements also limits the highest frequency a sound imaging system can reach, which is less than a value of the sound speed in the PZT elements divided by a length of the sound pulses.

Highest frequency<sound speed in PZT/PZT thickness

Detecting a Velocity of the Moving Objects from Fixed Sampling Points

In the invention, a velocity of different moving objects that pass the sampling points is calculated based on a fixed detecting depth and a changed speed of the sound pulses. Each of the sound pulses is reflected by different moving objects that pass the sampling points at the fixed detecting depth, which change the speed of reflected sound pulses and generate a TOF shift of the sound pulses. The TOF shift is used to calculate the velocity of the moving objects. So, the invention is different from Doppler mechanism, which detects the velocity of a targeted moving object based on the identical sound speed and a changed detecting distance. The targeted moving object compresses a frequency of a sound resource to generate a frequency shift, which is used to calculate the velocity of the targeted moving object. Doppler mechanism is widely used to detect the velocity of the moving objects. But, for the pulsed ultrasound, setting a gate fixes the detecting depth between the transducer and the sampling points. The TOF shift is not caused by the change of distance between the transducer and the moving objects that pass the sampling points. So, the fact is that the TOF shift is caused by the speed changes of the sound pulses but not changes of the detecting depth.

Figure 2:
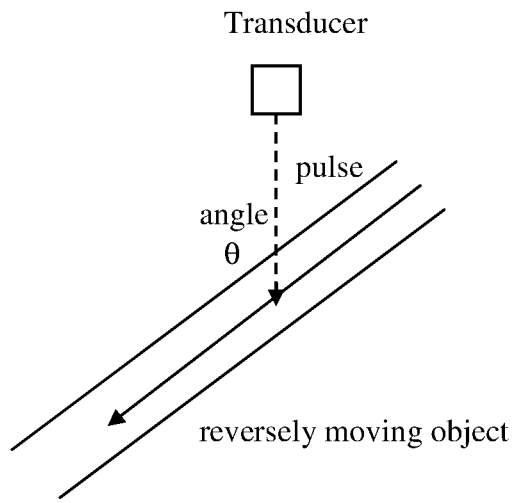
FIG. 2 is a schematic illustration of the rebound force shift of reversely moving objects to the sound pulses from the fixed sampling point.
Figure 2:
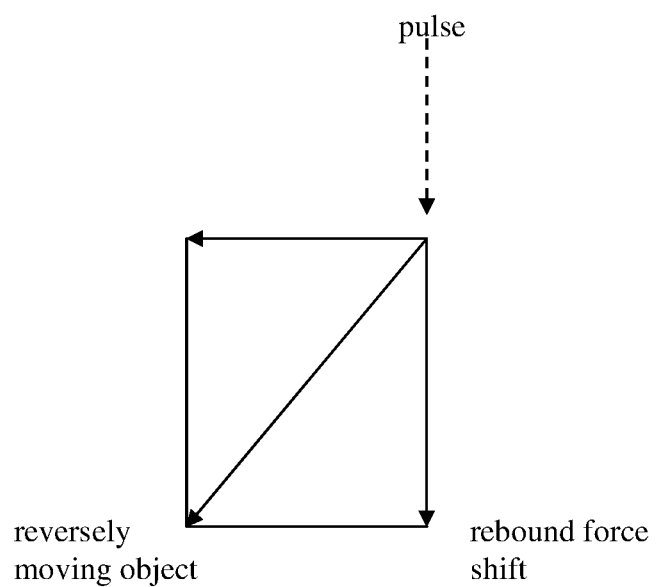

As containing the energy, the sound pulses can be reflected by motionless or moving objects. No matter in the continuous or the pulsed or the color ultrasound, when checking a speed of blood flow, the sound imaging system always detects the reflected sound pulses from the fixed sampling points where the sound beam cross with blood vessels to calculate TOF shift of the sound pulses. So, the detecting depth from the sampling points is fixed. Comparing to the motionless objects, the moving objects will change the rebounding force to the sound pulses. As in the FIG. 1, forward moving objects will generate forward rebound force shift against the sound pulses. The forward rebounding force shift is decided by the speed of the moving objects and an angle θ of the moving objects with the sound beam. The faster speed of the moving objects and smaller angle θ will generate greater forward rebounding force shift, which increases the speed of reflected sound pulses and reduces the TOF of the sound pulses. The smallest angle θ is zero. So, the TOF detected from the sampling points of the moving objects is smaller than the TOF detected from the sampling points of the motionless objects at the same depth. The TOF detected from the sampling points of the motionless objects equals calculated TOF, which is based on the detecting depth and the average speed of the sound pulses. TOF shift is difference between the calculated TOF and the detected TOF. A ratio (Rt) of the TOF shift to the calculated TOF reflects the changes of the velocity of the moving objects. A range of the Rt is from positive 1 to negative 1 and the Rt equals zero at baseline. The Rt is used in calculating the velocity of the moving objects in the pulsed ultrasound and the color sound. For the forward moving objects, the Rt is positive and above the baseline. On the contrary, as in the FIG. 2, reversely moving objects will generate reversely rebounding force shift with the same direction of emitted sound pulses, which reduces the rebounding force. The faster speed of the moving objects and greater angle θ will generate greater reversely rebounding force shift, which decreases the reflected speed of the sound pulses. The greatest angle θ is 180 degree. So, its TOF is increased and greater than the calculated TOF. As the result, the Rt value is negative and below baseline.

So, one aspect of the invention is calculating the velocity of the moving objects based on the TOF shift for the continuous or the pulsed or the color sound. As mentioned above, the speed of the sound pulses will gradually reduce, and the moving objects will generate the rebounding force shift, which changes the speed of the reflected sound pulses, the TOF and the TOF shift and the Rt. A moving object with the same speed may generate different TOF shift from different detecting depth. The Rt can compensate an effect of changes of the detecting depth on changes of the TOF shift. Therefore, the Rt can more accurately calculate the velocity of the moving objects from the different detecting depth.

Calculating a Velocity of Moving Objects for Continuous Ultrasound

Currently, it is considered that the speed of the sound pulses is fixed in the same medium during the transmission. The moving objects will change the frequency of the reflected sound pulses due to distance change between the transducer and the moving objects. The forward moving objects will compress the reflected frequency, which is higher than the emitted frequency. Its Doppler shift is above the baseline. The reversely moving objects will decompress the reflected frequency, which is lower than the emitted frequency. Its Doppler shift is below the baseline. So, calculating Doppler shift of the continuous ultrasound is based on difference between the reflected frequency and the emitted frequency. $V_{objects}$ is a speed of the moving objects, f is a frequency of a transducer, and V is an identical speed of the sound pulses in the transmitting medium.

$$\text{Doppler shift} = \text{reflected frequency} - \text{emitted frequency}$$

$$\text{Doppler shift} = \frac{2 \times V_{objects} \times f \times \cos(\theta)}{V}$$

Figure 7:
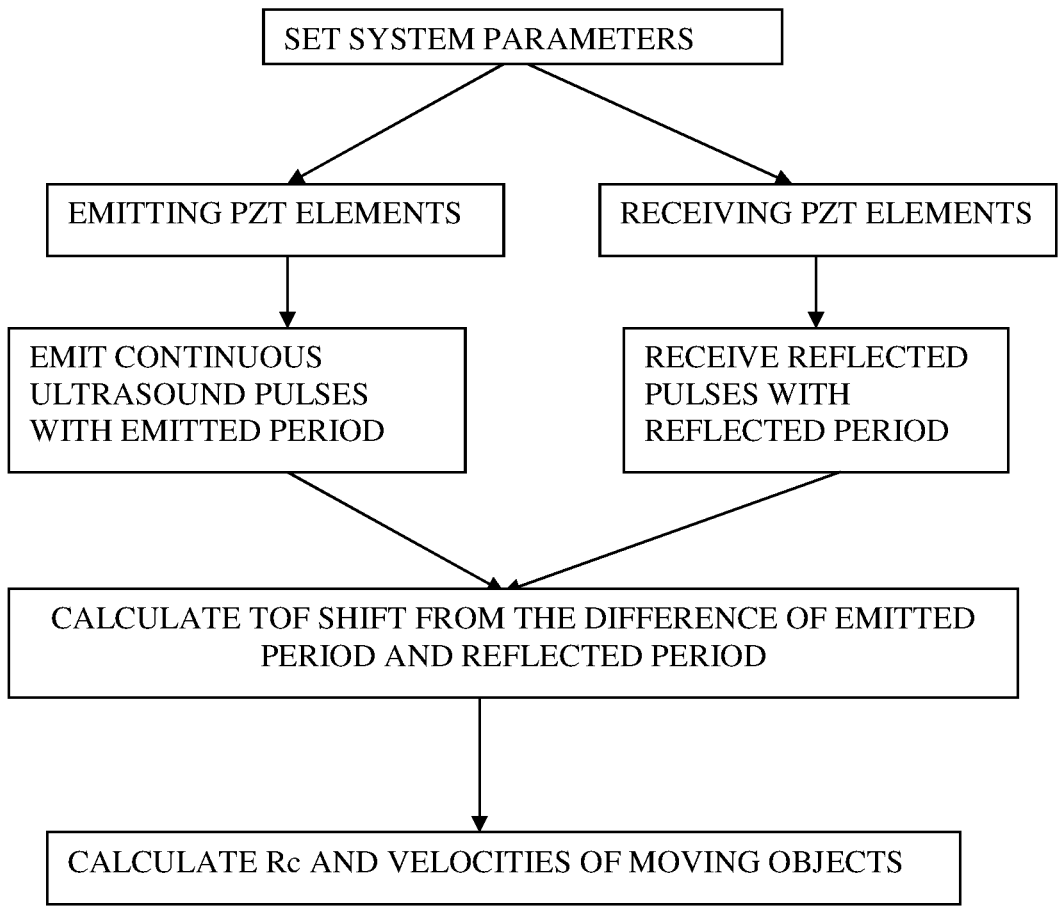
FIG. 7 is a schematic illustration of a computer program to calculate the Rt and velocities of the continuous ultrasound.
Figure 8:
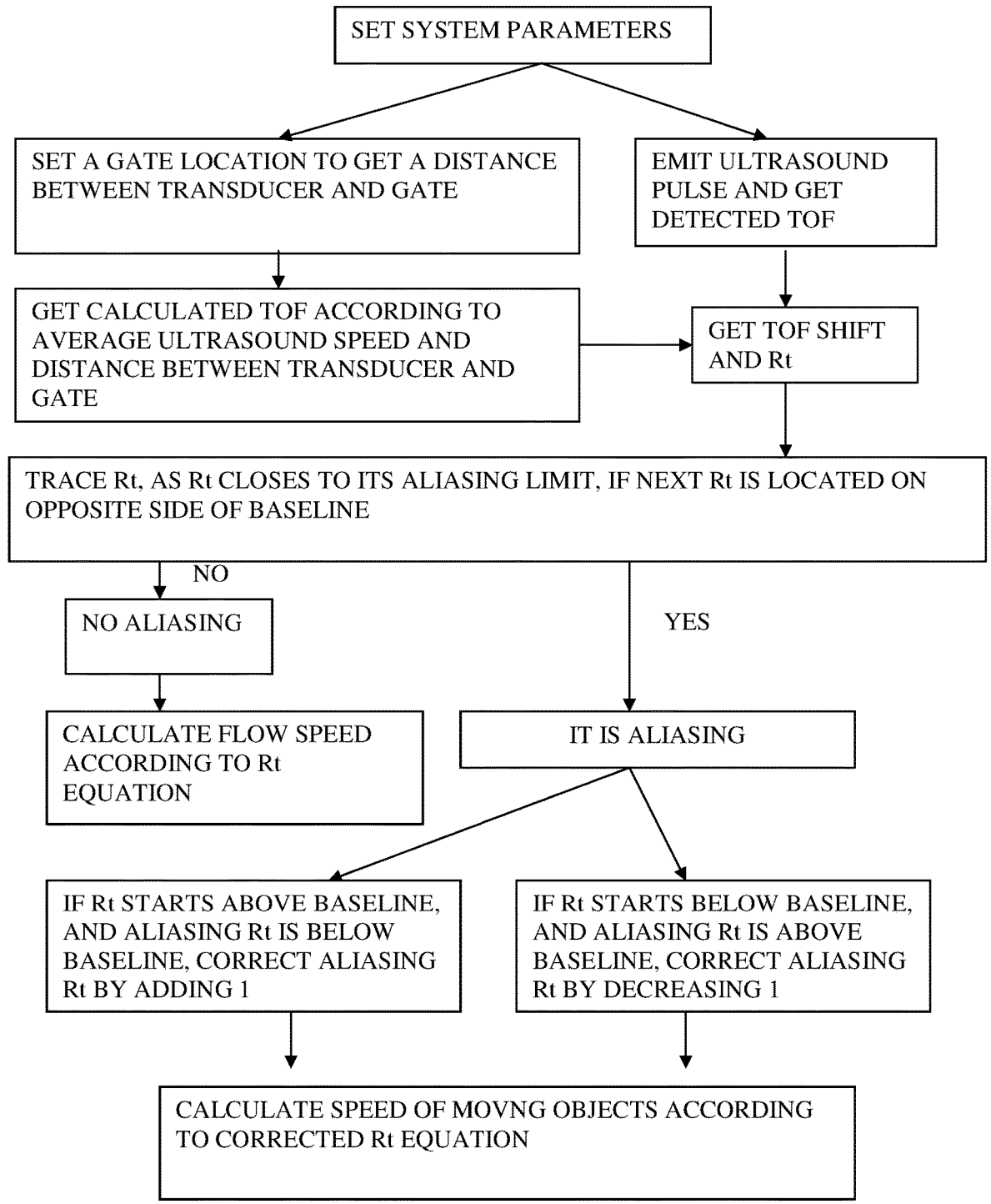
FIG. 8 is a schematic illustration of computer program to identify and correct the aliasing Rt, and calculate a speed of the moving objects for the pulsed ultrasound.

The invention discloses that a TOF shift of the continuous ultrasound is used to calculate the velocity of the moving objects. The TOF shift of the continuous ultrasound is difference between a time of emitting period and a time of reflected period. A PZT element separates two parts in a continuous ultrasound transducer. As in the FIG. 7, a half of the PZT element emits the continuous ultrasound pulses with an identical emitted period between previous and following emitted sound pulses, which is decided by the sound imaging system. Another half of the PZT element receives the reflected sound pulses from the sampling points below the PZT elements and detects the reflected period between previously and following reflected sound pulses for each sampling points. The reflected period is decided by the velocity of the moving objects. If the sound pulses are reflected from the sampling points with the motionless objects, the reflected period equals to the emitted period and their TOF shift is zero. So, a ratio (Rc) of the TOF shift to the emitted period is used to calculate the velocity of the moving objects from the different sampling points. The Rc presents a variation of the velocity of the moving objects. The value of the Rc is between positive 1 and negative 1, which is based on a direction of the moving objects. The Rc equals zero at a baseline. Then, the sound imaging system will use the Rc to calculate the velocity of the moving objects according to a Rc equation. Because the information of the average speed of the sound pulses and an angle between a sound beam and the direction of the moving objects can not be obtained from the continuous ultrasound, the Vm of the sound pulses is used in the Rc equation to calculate the velocity of the moving objects.

emitted period = the time between previous and following emitted pulses reflected period = the time between previously and following reflected pulses $$TOF \text{ shift} = \text{emitted period} - \text{reflected period}$$

$$Rc = \frac{TOF \text{ shift}}{\text{emitted period}}$$

$$TOF \text{ shift} = \frac{2 \times V_{objects} \times \text{emitted perior}}{V_m}$$

$$Rc = \frac{2 \times V_{objects}}{V_m}$$

Figure 3A:
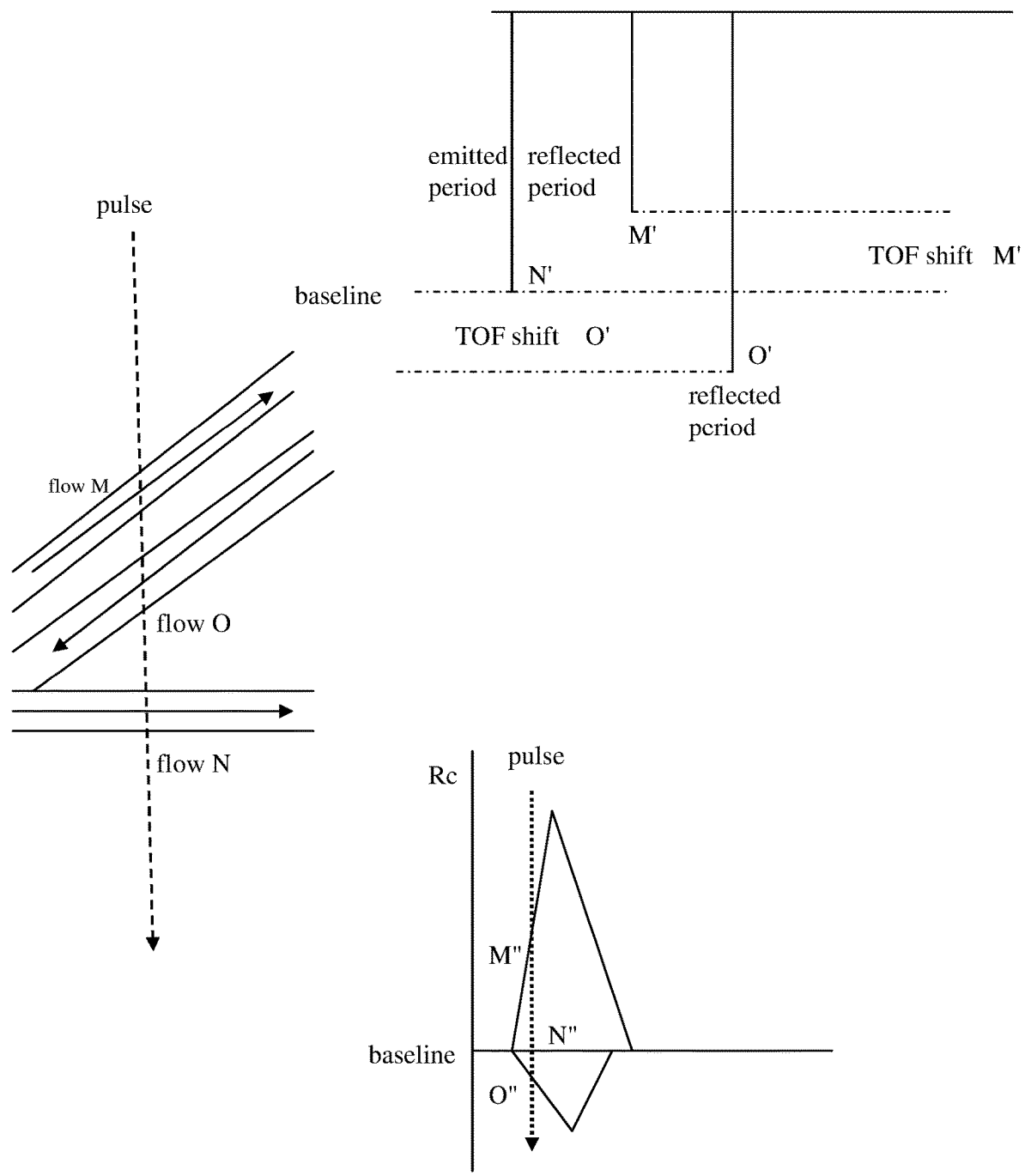
FIG. 3a is a schematic illustration of a time-of-flight (TOF) shift and a profile of a ratio (Rc) of the TOF shift to an emitted period of continuous ultrasound.

As in FIG. 3a, if the sound pulses are reflected from the sampling point (N) with the moving objects that are vertical to the sound beam, the emitted period equals to its reflected period, and its Rc is zero. But, if the sound pulses are reflected from a sampling point (M) with the forward moving objects, the speed of the reflected sound pulses will be accelerated due to the increasing rebounding force, which shorten the TOF M'. So, the reflected period from the sampling point M will be less than the time of the emitted period, which generates its positive Rc M' and is above the baseline. On the contrary, for a sampling point (O) with the reversely moving object, the TOF O' will be elongated due to the reduced rebounding force and the speed of the reflected sound pulses. So, the reflected period from the sampling O will be greater than the time of the emitted period, which generates its negative Rc O' and is below the baseline.

As FIG. 3a, for the continuous ultrasound, the receiving part of the PZT element collects the reflected sound pulses from all sampling points of different detecting depth from an area under the receiving PZT elements. If there are multiple sampling points for the moving objects with different velocities toward the PZT element, they will rebound the sound pulses with different reflected speed and TOFs, which generate different Rc values related to these sampling points. Then the sound imaging system will trace and compare a list of these reflected pulses and respectively present their Rc values on a Rc profile. For continuous ultrasound, because there are usually multiple sampling points of the different detecting depth with the different velocities of the moving objects under the PZT element, such as multiple blood vessels, its Rc profile often presents as spectral broadening, and the bigger Rc value from the sampling points with the faster moving objects is located at the higher position in the Rc profile. So, a computer program can be used to calculate the velocity of the moving objects based on the values of the Rc as in FIG. 7. Because there are no information of the detecting depth and the angle between the sound beam and the direction of the moving objects for the continuous ultrasound, the Rc can just calculate the velocity for the moving objects.

Calculating a Velocity of Moving Objects for Pulsed Ultrasound

For the pulsed ultrasound, a gate is set at a designed location with a fixed detecting depth between the transducer and the sampling points, which can get a calculated TOF based on the average speed of the sound pulses and the detecting depth. A size of the gate decides numbers of the sampling points within the gate. The PZT elements emit the sound pulses and receive reflected sound pulses to get a detected TOF. The moving objects will rebound the sound pulses and change the detected TOF, which generates the TOF shift between the calculated TOF and detected TOF. Rt is a ratio of the TOF shift to the calculated TOF, and the Rt equals zero at the baseline.

Figure 3B:
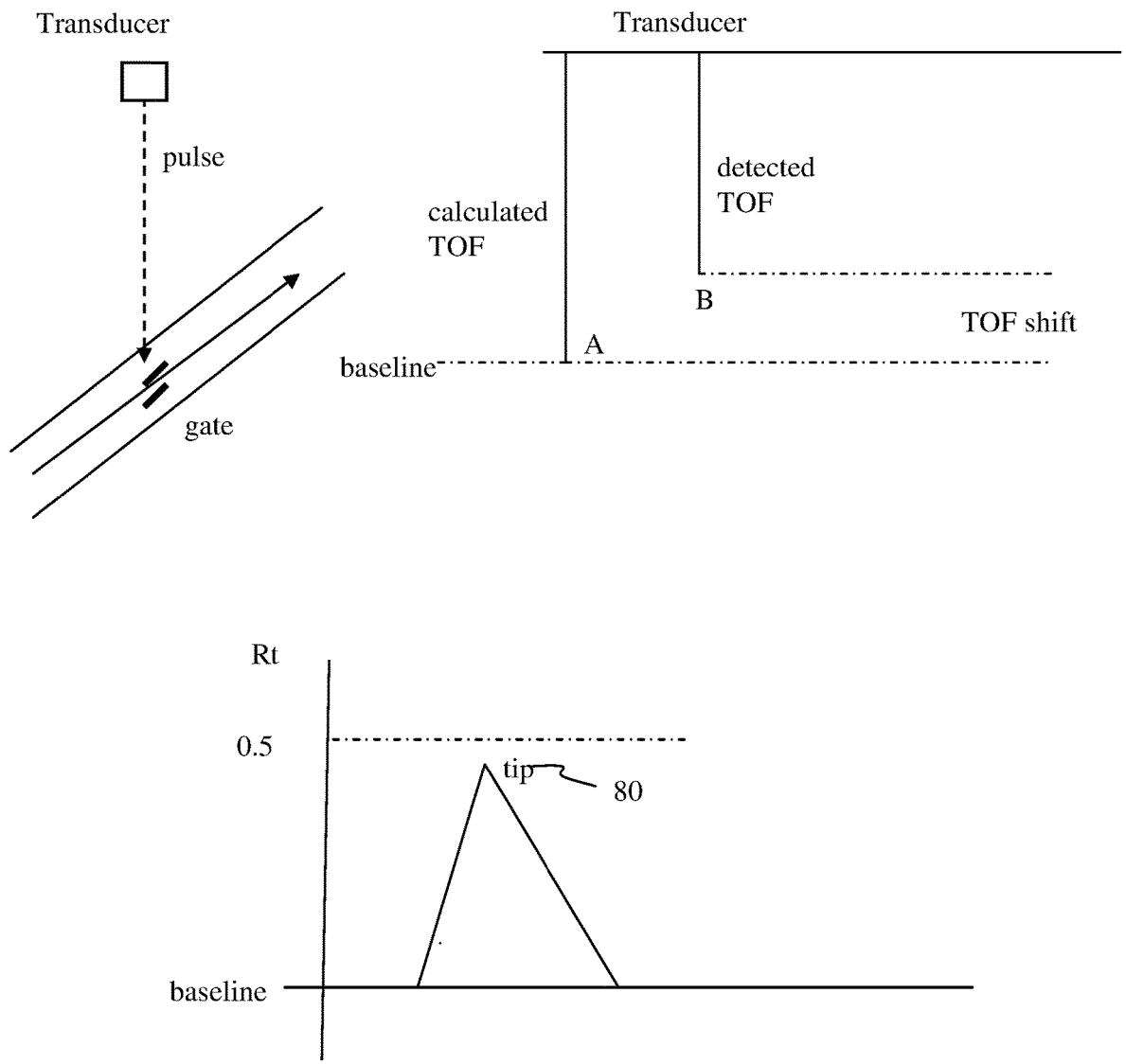
FIG. 3b is a schematic illustration of the TOF shift and a profile of a ratio (Rt) of the TOF shift to calculated TOF from the sampling point for the forward moving objects of pulsed ultrasound.

So, when the Rt excesses its aliasing limit, the sound imaging system will misinterpret the Rt, which generates an aliasing Rt. For a forward moving object, it accelerates the speed of the reflected pulses, which shorten its detected TOF as B in FIG. 3b. So, the detected TOF is smaller than the calculated TOF, and the Rt is positive and above the baseline. For forward moving objects, the detected TOF is decreased and is less than the calculated TOF. So the Rt is positive and above the baseline, which forms a Rt profile with a tip of the Rt profile away from the baseline (80 in FIG. 3b). On the contrary, reversely moving objects increase the detected TOF, which is greater than the calculated TOF.

Figure 3C:
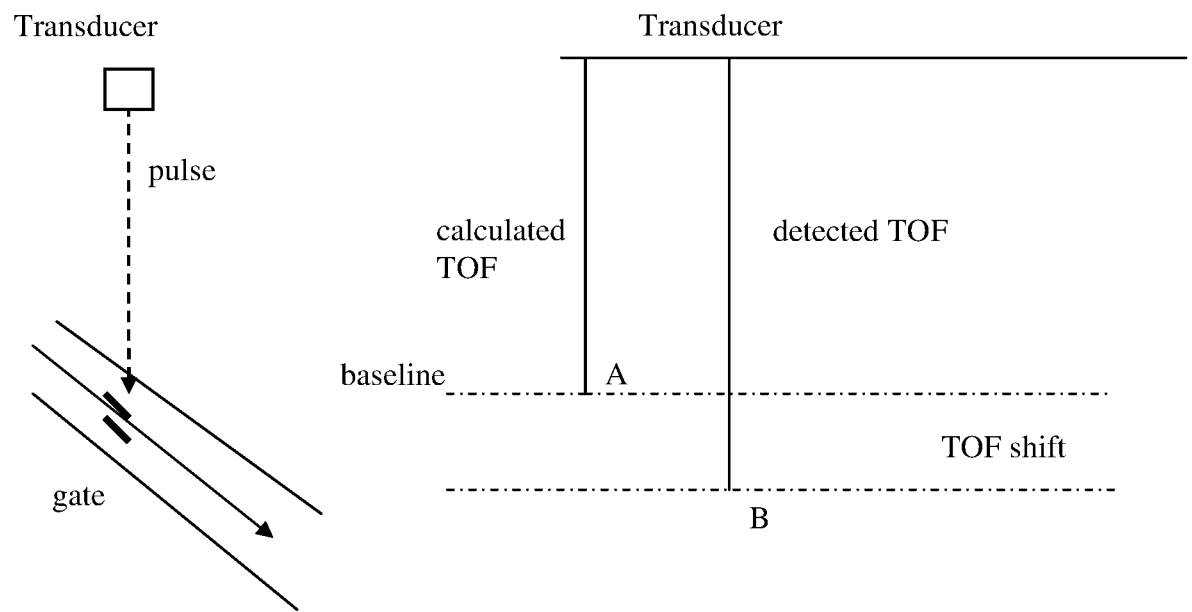
FIG. 3c is a schematic illustration of the TOF shift and the Rt profile from the sampling point for the reversely moving objects of the pulsed ultrasound.
Figure 3C:
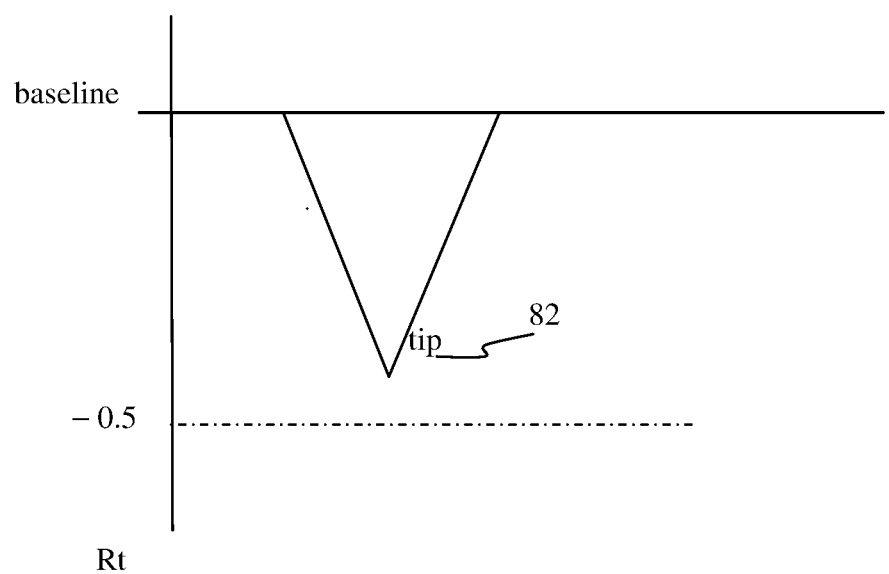

So the Rt is negative and below the baseline, and the tip of the Rt profile is away from the baseline (82 in FIG. 3c). Then the velocity of the moving objects can be calculated according the value of the Rt. Because there is the information of the detecting depth and the angle between the sound beam and the direction of the moving objects within the pulse ultrasound, the Rt can be used to calculate the speed of the moving objects.

$$TOF\ shift = calculated\ TOF - detected\ TOF$$

$$Rt = \frac{calculated\ TOF - detected\ TOF}{calculated\ TOF}$$

$$TOF\ shift = \frac{2 \times V_{objects} \times calculated\ TOF \times \cos(\theta)}{V_{avg}}$$

$$Rt = \frac{2 \times V_{objects} \times \cos(\theta)}{V_{avg}}$$

Calculating a Velocity of Moving Objects for Color Ultrasound

For the color ultrasound, within a designed area, the Rt is calculated for the moving objects from each sampling point based on the TOF and the calculated TOF. Different colors are designed to the forward moving objects and the reversely moving objects based on a positive or negative Rt value. For the forward moving objects, the detected TOF is smaller than the calculated TOF and the Rt is positive (B in FIG. 4); and for the reversely moving objects, the detected TOF is greater than the calculated TOF and the Rt is negative. The Rt will also be used to calculate the velocity of the moving objects. Because there is just depth information but no angle information for the color ultrasound, the velocity of the moving objects will be calculated without angle information in the Rt equation.

$$TOF\ shift = calculated\ TOF - detected\ TOF$$

$$Rt = \frac{TOF\ shift}{calculated\ TOF}$$

$$TOF\ shift = \frac{2 \times V_{objects} \times calculated\ TOF}{V_{avg}}$$

$$Rt = \frac{2 \times V_{objects}}{V_{avg}}$$

Identifying and Correcting Aliasing for Pulsed Ultrasound and Color Ultrasound

For the pulsed ultrasound and the color ultrasound, there is an aliasing, which is caused by misinterpreted the Rt by the sound imaging system. If the speed of the moving objects is too fast and makes the Rt greater than 0.5, which excesses its aliasing limit, the sound imaging system will misinterpret the Rt to make an aliasing Rt. Then the aliasing Rt is located on opposite side of the baseline, which presents the moving objects toward opposite direction. The aliasing Rt also disrupts continuation of the Rt profile and a wrong color is designed to the sampling points with the aliasing Rt.

Figure 4:
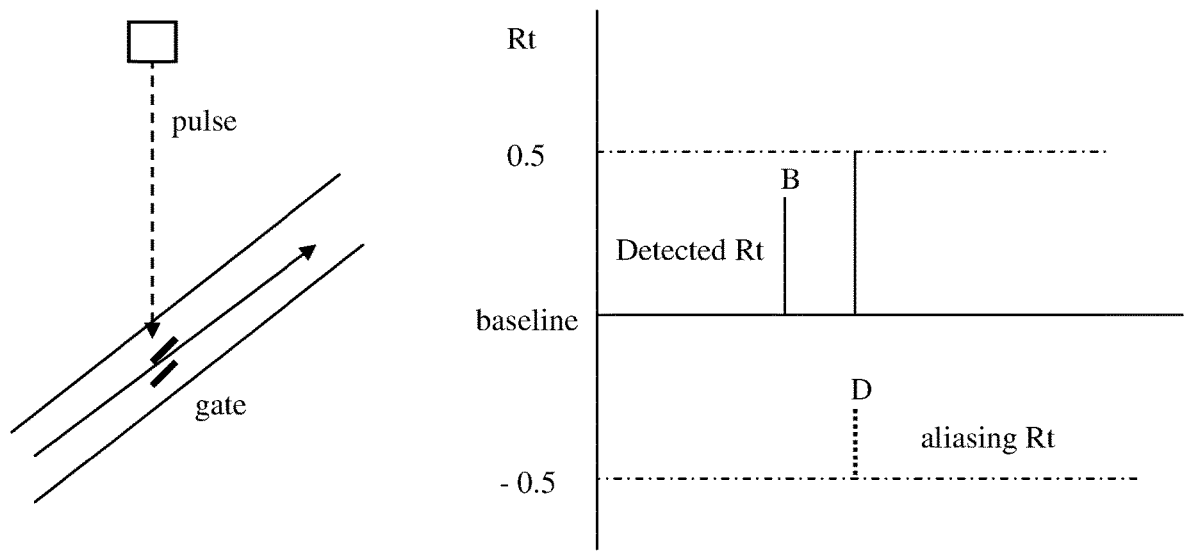
FIG. 4 is a schematic illustration of an aliasing Rt for the forward moving objects of the pulsed ultrasound.
Figure 5A:
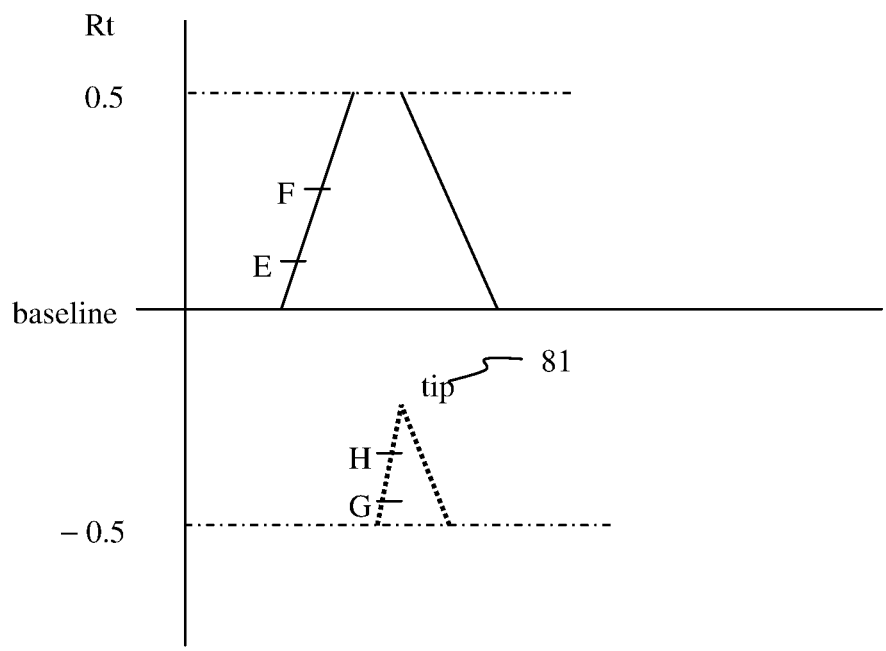
FIG. 5a is a schematic illustration of the aliasing Rt profile for the forward moving objects of the pulsed ultrasound.

For forward moving objects, if the Rt is greater than 0.5, the sound imaging system will misinterpret the Rt and reduce 1 from the Rt to generate the aliasing Rt (D in FIG. 4). So, the aliasing Rt becomes a negative value and below baseline, which misrepresents the moving objects moving toward opposite direction. As the result, before the Rt exceeds its aliasing limit, the value of the Rt is above the baseline (from E to F in FIG. 5a). But, after the Rt excesses its aliasing limit, the value of the aliasing Rt is below the baseline (from G to H in FIG. 5a) and makes a tip of the Rt profile toward the baseline (81 in FIG. 5a). So the aliasing Rt discontinues the Rt profile.

Aliasing $Rt=Rt-1$

Figure 5B:
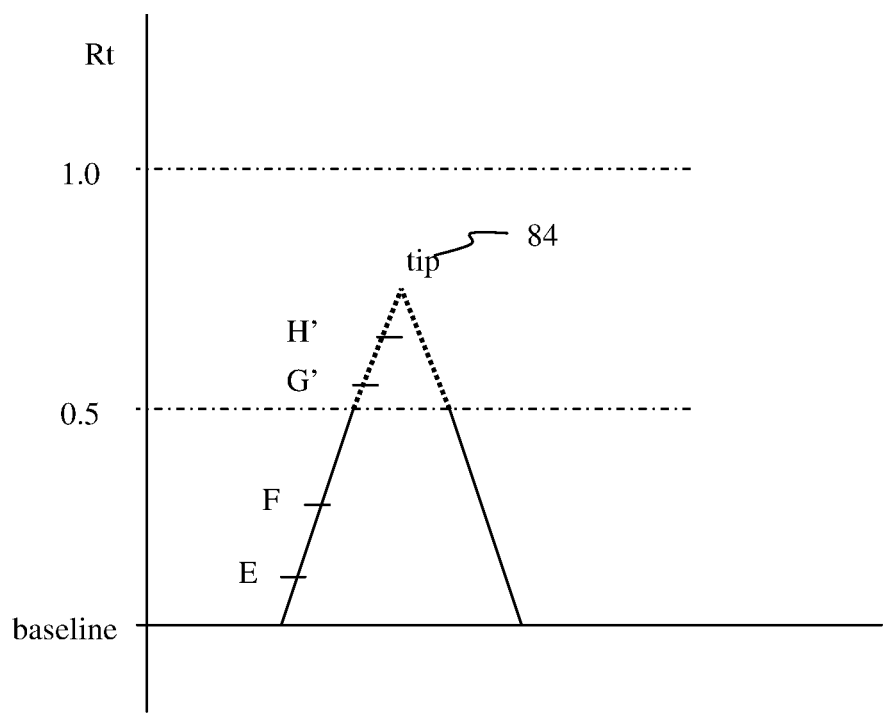
FIG. 5b is a schematic illustration of a corrected Rt profile for the forward moving objects of the pulsed ultrasound.

So, in the invention, a computer program is designed to identify and correct the aliasing Rt. For the forward moving objects, the Rt is above the baseline and continuously increased toward its aliasing limit. But, after the Rt excesses its aliasing limit, the aliasing Rt becomes below the baseline. The computer program will trace and compare the Rt with the previous Rt. IF the Rt approaches its aliasing limit and the following Rt is below the baseline, which discontinues the Rt profile, the aliasing Rt is identified. After identifying the aliasing Rt, the sound imaging system will register the corrected Rt (H' and G' in FIG. 5b) by adding 1 to the aliasing Rt.

Corrected $Rt=$aliasing $Rt+1$

After rectifying the registering the aliasing Rt, the value of the corrected Rt will keep increase as increase of the speed of the forward moving objects, and the tip of the Rt profile is above the baseline and away the baseline (84 in FIG. 5b), which reestablish the continuation of the Rt profile, and the correct Rt can be used to calculated the velocity of the moving objects.

Figure 6A:
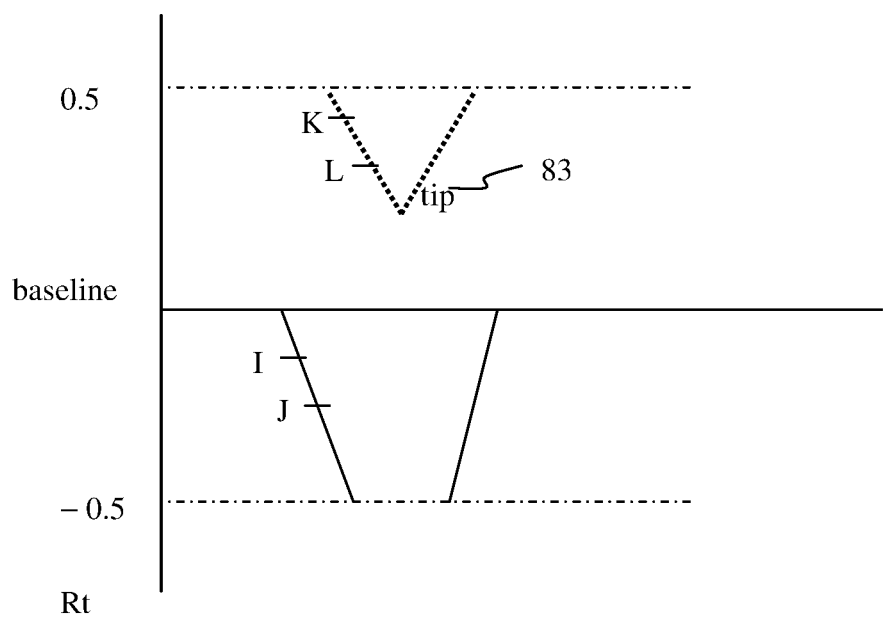
FIG. 6a is a schematic illustration of the aliasing Rt profile for the reversely moving objects of the pulsed ultrasound.

For the reversely moving objects, the rebounding force is reduced, which decreases the reflected speed of the sound pulses and increases their TOF, which is greater than the value of the calculated TOF. So, the value of the Rt is negative and below the baseline (I and J in FIG. 6). If the value of the Rt excesses its aliasing limit, the sound imaging system will misinterpret the Rt and adding 1 to the Rt to generate an aliasing Rt (K and L in FIG. 6a), which becomes positive and above the baseline, which make the tip of the Rt profile is above the baseline and toward the baseline (83 in FIG. 6a). As a result, the continuity of the Rt profile is disrupted. In the invention, the computer program is used to identify the aliasing. As the value of Rt is close to its aliasing limits and following Rt is above the baseline, the aliasing Rt is identified.

Aliasing $Rt=Rt+1$

After identifying the aliasing Rt, the computer program will rectify the aliasing TOF shift by subtract 1 from the aliasing Rt:

corrected $Rt=$aliasing $Rt-1$

Figure 6B:
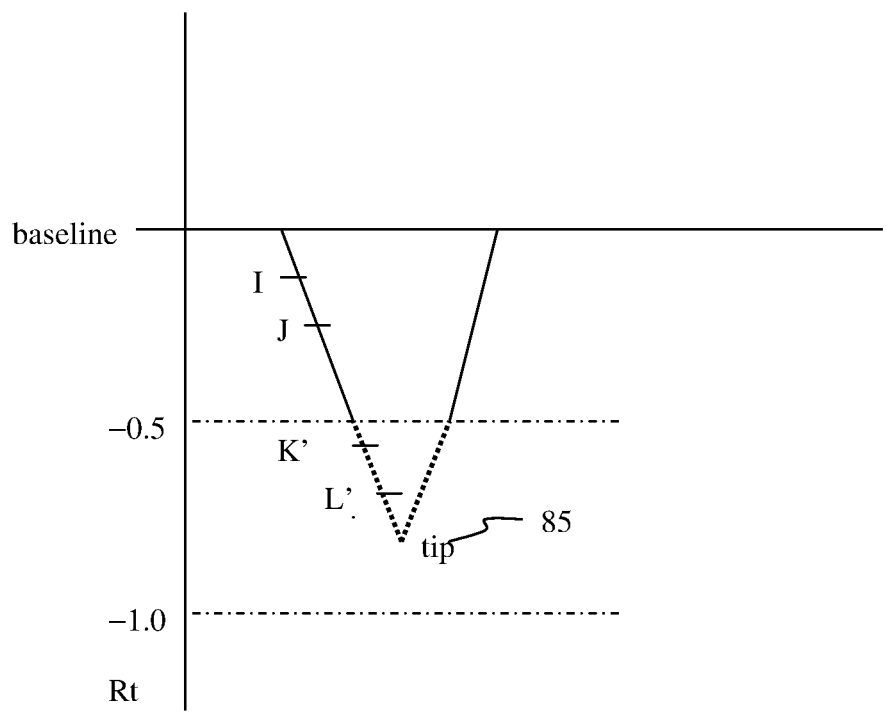
FIG. 6b is a schematic illustration of the corrected Rt profile for the reversely moving objects of the pulsed ultrasound.

After correcting the aliasing Rt, the corrected Rt will continuously increase as the speed of the reversely moving objects keeps increase, which makes the tip of the corrected Rt profile below the baseline and away the baseline (85 in FIG. 6b). The corrected Rt (K' and L' in FIG. 6b) will reestablish the continuation of the Rt profile, and it can be used to calculate the velocity of the moving objects.

Another method of avoiding the happening of aliasing is modifying the computer program in the sound imaging system to prevent adding or subtracting the value of 1 into the Rt after the Rt exceeds its aliasing limit.

Differentiating Color of Aliasing from Color of Turbulent Flows for Color Ultrasound For the color ultrasound, wrong color is designed to the sampling points due to the aliasing Rt, which generates color of the aliasing. But, there are similar color patterns between the color of the aliasing and color of turbulent flows. For the aliasing pattern, the color of the aliasing mistakenly presents as the direction of the moving objects toward opposite side after the Rt exceeds its aliasing limits. For the turbulent flows, the color of the turbulent flows truly presents their moving direction. So, this will make the difficulties for clinical judgment and diagnosis for pathological situations. In the invention, differentiating the color of the aliasing from the color of the turbulent flows is based on the characters of the Rt profile of different colors.

Figure 9:
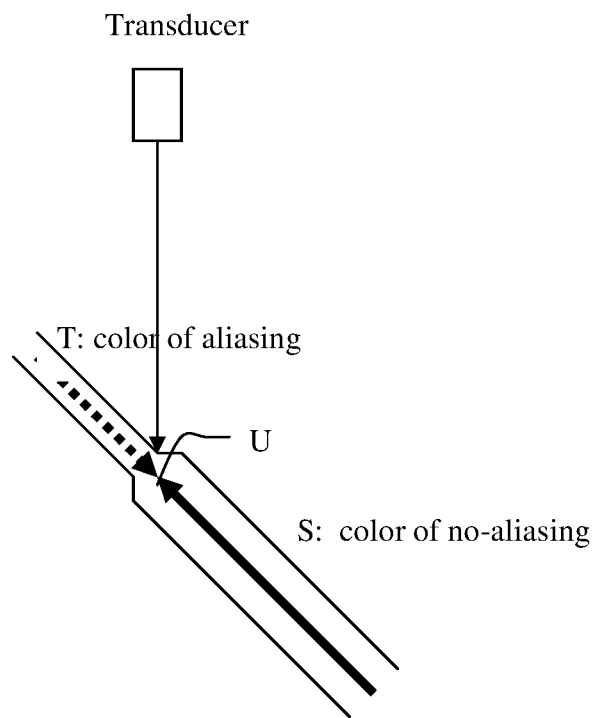
FIG. 9 is a schematic illustration of a color of aliasing in color ultrasound.
Figure 11:
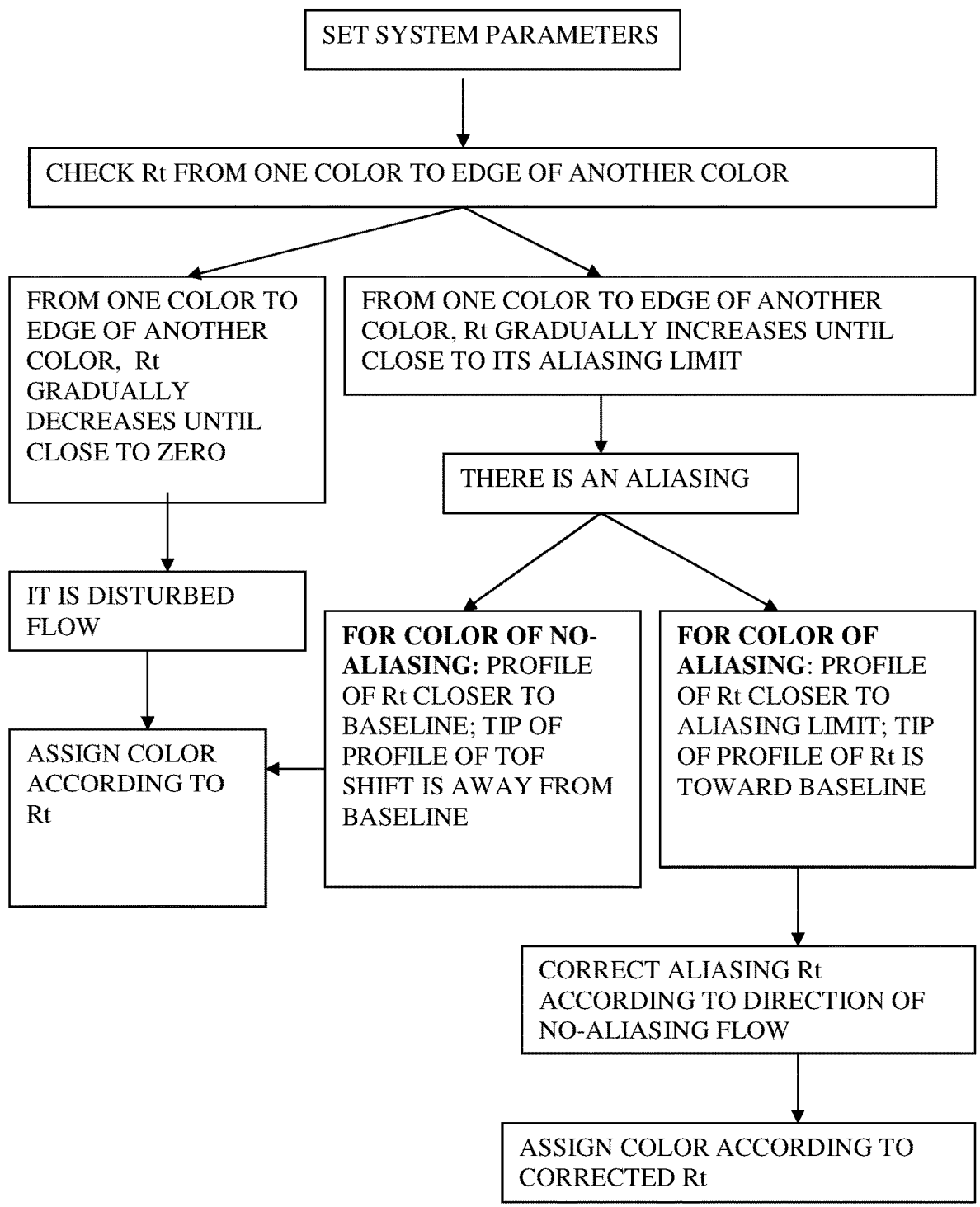
FIG. 11 is a schematic illustration of computer program to differentiate the color of the turbulent flow from the color of the aliasing and correct the color of the aliasing based on the Rt.

For the color of the aliasing in FIG. 9, when a flow (S) passes a narrow part of vessel, the speed of a flow will be accelerated within the narrow part. If the Rt excesses the aliasing limit, the aliasing Rt marks the flow with a color of the aliasing (T) at the narrow part, which represents the flow toward opposite direction. Color of U represents the Rt at the aliasing limit between the color of the no-aliasing S and the color of the aliasing T. From the color T to the color U, or from the color S to the color U, their Rt is gradually increased until close to the aliasing limit. For the color of the aliasing (color T in FIG. 9), the aliasing Rt profile is closer to the aliasing limit with its tip of the aliasing Rt profile toward baseline. But for the color of the no-aliasing (color S in FIG. 9), the Rt profile is more close to the baseline with the tip of the Rt profile away the baseline. Correcting the aliasing Rt is based on the direction of the no-aliasing flow as forward or reversely moving direction. Then the color of the aliasing can be corrected based on the Rt of the no-aliasing flow. The designed computer program in FIG. 11 will trace and identify the characters of the Rt profile, and correct the color of the aliasing by rectifying their aliasing Rt.

Figure 10:
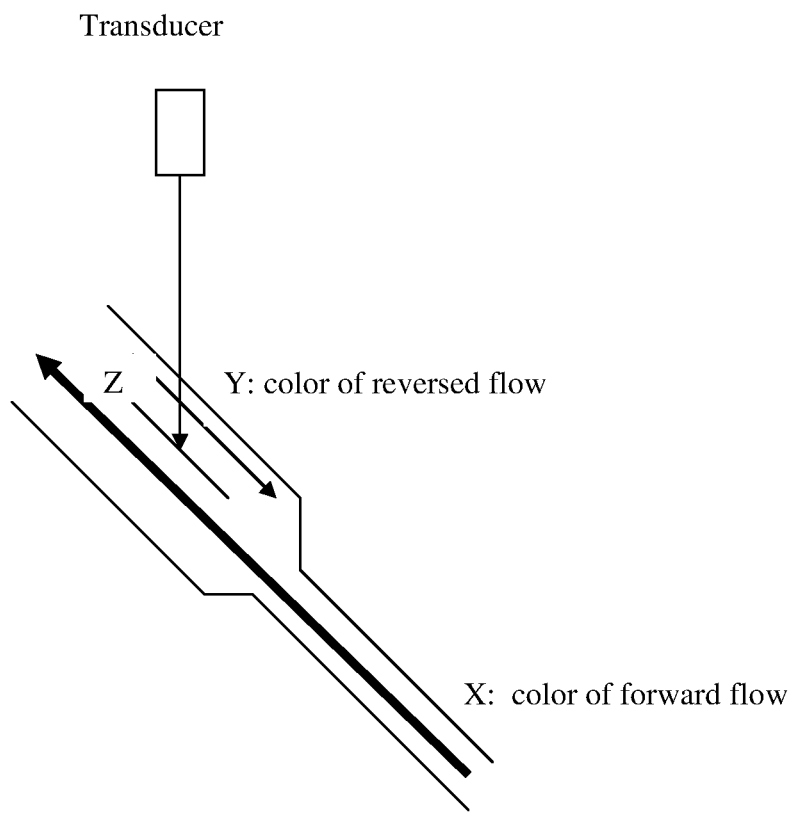
FIG. 10 is a schematic illustration of colors of turbulent flow in the color ultrasound.

But for the color of the turbulent flows in FIG. 10, the color of X represents a forward flow that enters in an enlarged part of a blood vessel. The flow will become turbulent at the enlarged part of the vessel, and the color of Y represents a reversed blood flow. The color of Z represents the edge between the color of X and the color of Y. The Rt for the color Z will be close to zero because its Rt is close to the baseline. Because the speed of the flow is gradually decreased to the color of Z, the Rt from one color to the edge of another color is gradually reduced until close to the zero. The tip of the Rt profile for both colors is away from the baseline and the Rt profile keeps its continuity. So, the colors of the sampling points are assigned based on their Rt.

So, differentiating and rectifying the aliasing Rt for the color of aliasing from the Rt for the color of turbulent flows will benefit the clinical judgment and diagnosis for truly pathological conditions.

Calculation of Speed of Moving Objects with Two Separated PZT Elements without Need to Adjust the Angle of the Sound Beam The speed value of the moving objects is important in judging some pathological conditions, such as a stenosis of blood vessels. The angle of the sound beam with the direction of the moving objects is an important factor to affect accuracy of a calculated speed of the moving objects. Currently in order to get an accurate speed of the moving objects, it is important to adjust the angle of the sound beam with the direction of the moving objects within 45 to 60 degree. But, the tortuous blood vessels and variant performances of sonographers often derive different speed values of the moving objects from same testing site, which increases the difficulties in the clinical diagnosis. In the invention, by simultaneously checking the Rt at same sampling point from two separated PZT elements, the speed value of the moving objects can be accurately calculated without the need to adjust the angle of the sound beam with the direction of the moving objects, which simplifies the operating procedures and avoids the variation of detection.

Figure 13:
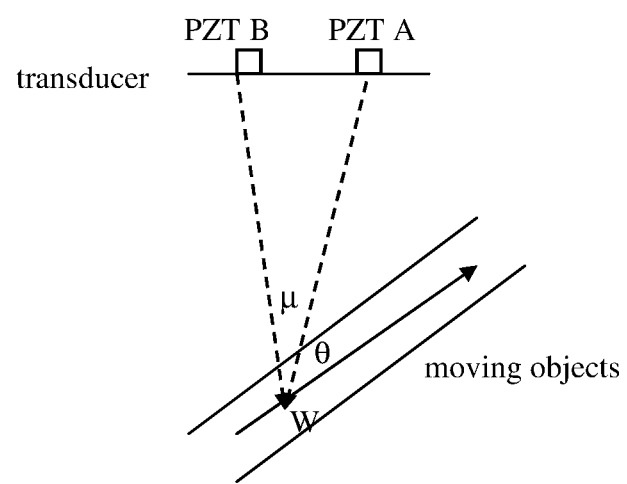
FIG. 13 is a schematic illustration of calculation of the speed of the moving objects from same sampling point with two separated PZT elements.

As in the FIG. 13, after selecting a sampling point (W in FIG. 13), PZT A element and PZT B element send different number of the sound pulses during each pulse duration, such one sound pulse of each pulse duration from the PZT A element and two sound pulses of each pulse duration from the PZT B elements. So two TOF shift are simultaneously detected from PZT A element and PZT B element, and an angle μ is between two sound beams from the PZT A element and the PZT B element, and an angle θ is between sound beam from the sound beam A with the direction of the moving objects. Therefore, their individual Rt will be obtained, and the speed of the moving objects ($V_{objects}$) can be calculated based on the values of the Rt, the angle μ and the average speed of the sound pulses in the transmitting medium ($V_{avg}$).

$$Rt\ A = \frac{\text{calculated } TOF\ A - \text{detected } TOF\ A}{\text{calculated } TOF\ A}$$

$$Rt\ B = \frac{\text{calculated } TOF\ B - \text{detected } TOF\ B}{\text{calculated } TOF\ B}$$

$$Rt\ A = \frac{2 \times V_{objects} \times \cos(\theta)}{V_{avg}}$$

$$Rt\ B = \frac{2 \times V_{objects} \times \cos(\theta + \mu)}{V_{avg}}$$

$$V_{objects} = \frac{V_{avg} \times \sqrt{(Rt\ A)^2 - 2 \times Rt\ A \times Rt\ B \times \cos(\mu) + (Rt\ B)^2}}{2 \times \sin(\mu)}$$

Calculation of Detecting Depth and Velocity with Coded Sound Pulses

Figure 12:
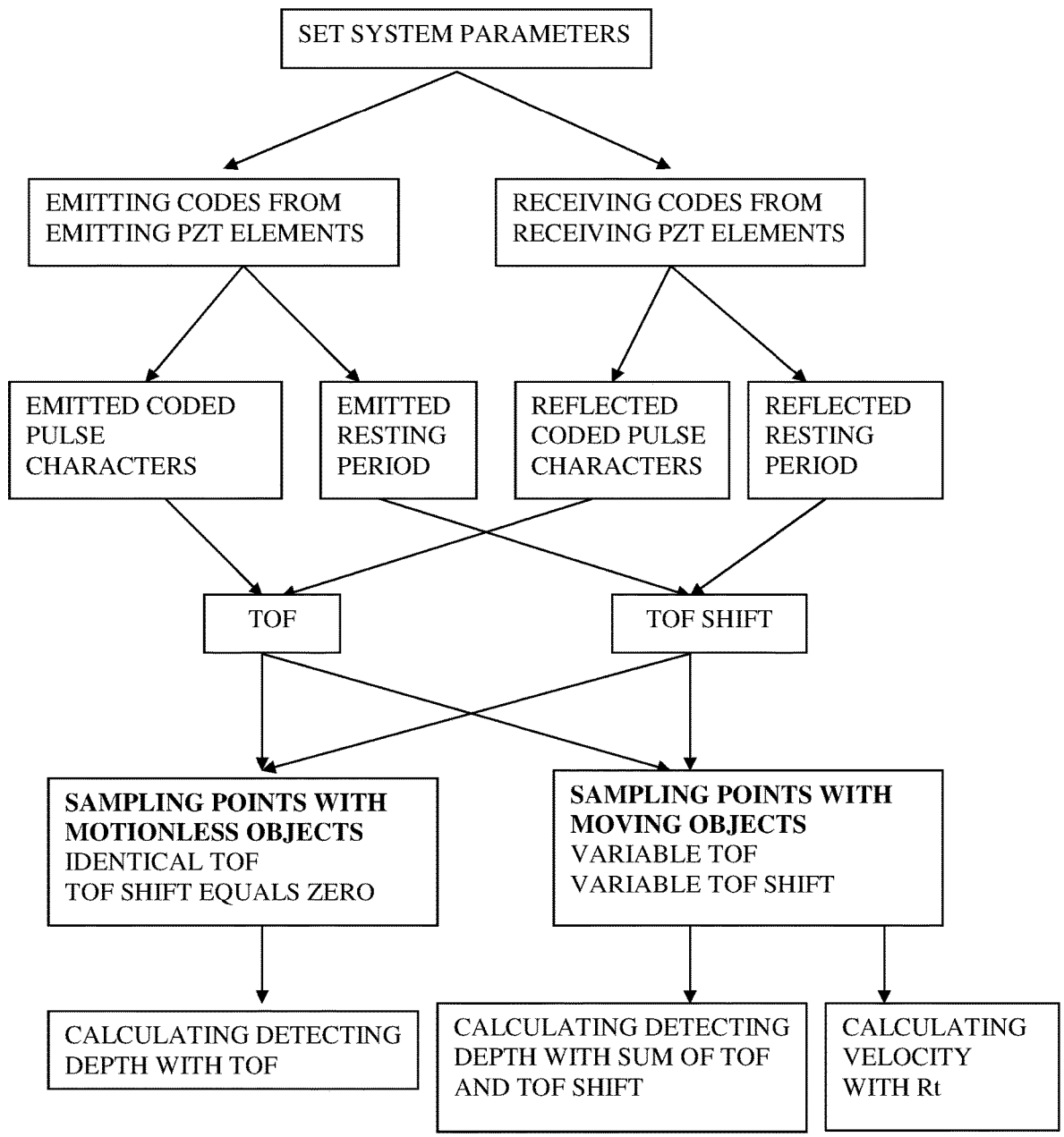
FIG. 12 is a schematic illustration of calculation of a detecting depth and the velocities of the moving objects at the sampling points with coded sound pulses.

Because the pulsed and the color ultrasound causes the aliasing and the continuous ultrasound can not obtain the detecting depth, a method of coded sound pulses can combine advantages of the pulsed ultrasound and the continuous ultrasound as well as avoid their disadvantages. This method is more like coding genomic sequence of deoxyribonucleic acid (DNA). A pulse duration is a time that the sound pulses are sent. During each pulse duration, different numbers of the sound pulses are sent, which is assigned a pulse character. For instance, just one pulse within the pulse duration is assigned as a pulse character A, two pulses as a pulse character C, three pulses as a pulse character G, and four pulses as a pulse character T. A resting period is a time between each adjacent pulse duration, and the resting period for the emitted sound pulses keeps identical. A transducer of the sound imaging system contains one pair or more of sending PZT elements and receiving PZT elements. The sending PZT elements send the sound pulses with specific coded pulse characters, such as ATC GCG . . . , which is like a code of DNA sequence. By this way, it actually endows information of emitting time for each pulse character. The receiving PZT elements receive reflected sound pulses, which contain the same code of pulse characters, such as A'T'C' G'C'G' . . . , which contains information of receiving time for each pulse character. Therefore, TOF can be obtained from the time between the emitting time and the receiving time of the correlated pulse characters. At the same time, TOF shift can also obtained from the time difference between emitting resting period and receiving resting period of the related pulse characters. For instance, the TOF of pulse character A can be obtained from a time between the emitted pulse character A and the reflected pulse character A', and TOF shift can be obtained from a time difference between the emitted resting period of the pulse character A and the receiving resting period of the pulse character A'. If reflections of the sound pulses from one sampling point keep identical TOF and their Rt is zero, it means the reflected sound pulses coming from the sampling point with the motionless objects. So, the TOF can be used to calculate the detecting depth of the sampling points. If the value of the TOF and the Rt keep variable, it means the reflected sound pulses coming from the sampling point with the moving objects. So, the Rt can be used to calculate the velocity of the moving objects. Because the moving objects change the TOF, which can not be used to calculate its actual detecting depth. By adding the TOF shift into the TOF, the TOF shift will compensate the changed part of the TOF. For the forward moving objects, the TOF shift is positive, which will compensate shortened TOF. For the reversely moving object, the TOF shift is negative, which will offset extended TOF. Rco is a ratio of the TOF shift with the emitted resting period. So, a sum of the TOF shift with the TOF can be used to calculate the detecting depth of the sampling points with the moving objects. So, the method of the coded sound pulses combines the advantages of the pulsed ultrasound and the continuous ultrasound in the sound imaging system, which can simultaneously obtain the detecting depth and the velocity from the sampling points (FIG. 12). It also avoids the aliasing for the moving objects with a high speed.

Improving Imaging Quality with Coded Sound Pulses

Because each PZT element may not only receive the reflected sound pulses emitted by it but may also receive the reflected sound pulses emitted from other PZT elements, which cause artifacts, such as a mirror image due to one emitted sound pulse reflected to two PZT elements with one of them as duplicately reflected sound pulses or refraction due refracted sound pulses. The noise is background signals. The noise and artifacts will affect the sound imaging quality. With each PZT element emits its specific codes of the pulse characters, after receiving reflected sound pulses, the sound imaging system will compare the received codes of the pulse characters with the emitted ones, and register locations of the sampling points that have the same received codes of the pulse characters with the emitted codes of the pulse characters to an area belonging to the PZT element that emits the codes of the pulse characters. By this way, wrong received codes of the pulse characters from the duplicately reflected sound pulses in the mirror image and the refracted sound pulses are rectified to correct PZT elements and non-coded background signals are deleted, which improve the sound imaging quality.

TOF shift=emitted resting period−received resting period $$Rco = \frac{TOF\ shift}{emitted\ resting\ period}$$

$$Rc = \frac{2 \times V_{objects}}{V_{avg}}$$

sum of $TOF = TOF + TOF$ shift $$Detecting\ depth = \frac{V_{avg} \times sum\ of\ TOF \times (1 - Coef)}{2 - Coef}$$

Constructing Two-Dimension Imaging with Coded Sound Pulses

Multiple pairs of the emitting PZT elements and the receiving PZT elements are linear arranged within the transducer to obtain the detecting depth (y) and the velocity (v) of the sampling points. The linear location of the PZT elements decides a value (x) of the sampling points. A two-dimension (2D) dataset (x, y, v) can be collect to construct 2D images of the sampling points. The x and the y decide the location of the sampling points and the v is designed with different colors, which represent the velocity of the moving objects that pass the sampling points.

Constructing Three-Dimension Imaging with Coded Sound Pulses

Obtaining a three-dimension (3D) dataset (x, y, z, v) of three orthogonal axes from a plurality of succession of the 2D dataset, 3D images can be constructed from the 3D dataset. A value of the z represents a position of the sampling points in a volumetric image array. The 3D dataset can be used to construct different 3D images based on requirements of clinical diagnoses: (1) a compound 3D image contains the sampling points of the motionless and the moving objects, the colors are used to represent the sampling points with the moving objects; (2) a 3D image just contains the sampling points of the moving objects, the 3D image clearly presents a volumetric information of vessels with the velocity of the moving objects within the vessels. So, pathologic features, such as a stenosis of the vessels or the turbulent flow within the vessels, can help the clinical diagnosis; (3) a 3D image just contains the sampling points with the motionless objects, which presents solid parts of a target organ.

Improving Temporal Resolution with Coded Sound Pulses

Continuously emitting and receiving the coded sound pulses decreases a time from the beginning of one frame to the next one, which improves the ability of the sound imaging system to distinguish between instantaneous events of fast moving objects, such as a cardiac movement. As the result, it improves 2D and 3D imaging quality.

Other applications, advantages, alternations, modifications, or equivalents to the disclosed embodiments are obvious to those skilled in the art and are intended to be encompassed within the scope of the present disclosure.

What is claimed is:

1. A method of constructing two dimension and three dimension images based on speed changes of sound pulses, which will rectify compromised detecting depth and speed from sampling points based on fixed speed of the sound pulses, the method comprising:
   correctly registering a position of sampling points on sound images by calculating a detecting depth based on speed changes of sound pulses during a transmission, which will rectify the compromised detecting depth based on the fixed speed of the sound pulses, the method comprising:
   establishing a sound imaging system containing piezoelectric (PZT) elements within a transducer, wherein the PZT elements send emitted sound pulses and receive reflected sound pulses from the sampling points to calculate time-of-flight (TOF); and
   establishing a speed reducing coefficient (Coef) of the sound pulses in a transmitting medium, wherein the Coef contains various speed affecting factors for the sound pulses, including a density of the transmitting medium, a density and a thickness of the PZT elements, and a constant value (k), which comprising:

$$coef = \frac{k \times medium\ density}{PZT\ density \times PZT\ thickness}; \text{ and}$$

calculating an emitted time (TOFa) of the sound pulses emitted from the PZT elements to the sampling points, wherein the emitted time from the PZT elements to the sampling points is less than a reflected time from the sampling points back to the PZT elements due to the speed reduction during the transmission;

$$TOFa = \frac{TOF(1 - Coef)}{2 - Coef}; \text{ and}$$

obtaining an average speed ($V_{avg}$) of the sound pulses within the emitted time based on a maximal speed ($V_m$) of the sound pulses, the Coef and the TOFa; the $V_m$ is a maximal speed of the sound pulses as just entering the transmitting medium from the PZT elements, wherein the $V_{avg}$ is variable due to different detecting depths of the sampling points, which will compensate an effect of the speed reduction on calculating the detecting depth, which comprising:

$V_{avg} = V_m \times (1 - Coef \times TOFa)$; and

Calculating the detecting depth of the sampling points, wherein the detecting depth is based on the $V_{avg}$ and the TOFa, which is more accurate than a compromised detecting depth of the sampling points calculated based on an identical speed of the sound pulses and the TOF Detecting depth=$V_{avg} \times$TOFa Correctly registering the position of the sampling points on the sound imaging system, wherein the compromised detecting depth of the sampling points based on the identical speed of the sound pulses is rectified.

2. The method of claim 1, further comprising regulating a sound intensity of the sound pulses to control the detecting depth, wherein the sound intensity is a multiplication value of a length of the sound pulses and a density of the sound pulses and a speed of the sound pulses; the density of the sound pulses is related to a density of the PZT elements and the length of the sound pulses is related to a thickness of the PZT elements, and the speed of the sound pulses is related to a power of electric output on the PZT elements; increasing the density of the PZT elements and/or the thickness of the PZT elements and/or the power of the electric output on the PZT elements will increase the detecting depth of the sound pulses, which comprising:

Sound intensity (kg/MS)=sound length (M)×sound density (Kg/M$^3$)×sound speed (M/S)

Sound intensity=acoustic impedance×distance

M=meter; Kg=kilogram; S=second.

3. The method of claim 1, further comprising improving an axial resolution by decreasing the length of the sound pulses, wherein decreasing the thickness of the PZT elements will generate a shorter length of the sound pulses, which increases the axial resolution of the sound images.

4. The method of claim 3, further comprising optimizing the axial resolution of the sound images with compound PZT elements, wherein the transducer contains the PZT elements with different thicknesses, which will focus on their optimized detecting depth; thin PZT elements focus on proximal sampling points and thick PZT elements focus on distal sampling points, which improve the axial resolution of the sound images.

5. The method of claim 1, further establishing the sound image for a continuous, a pulsed and a color ultrasound by calculating a velocity of moving objects based on the speed changes of the sound pulses, which will rectify the compromised detecting speed of moving objects based on the fixed speed of the sound pulses, the method comprising:

obtaining a TOF shift from the sound pulses reflected from different moving objects that pass the sampling points to calculate the velocity of the moving objects; and constructing the images or the profile of the velocity of the moving objects from the sampling points.

6. The method of claim 5, further comprising establishing the sound images for the continuous ultrasound, which comprising:

a PZT element within the transducer sends continuous ultrasound pulses with a identical emitted period from a half of the PZT element and receives the reflected sound pulses with a reflected period from another half of the PZT element, the emitted period is a time between a previous and following emitted sound pulses, the reflected period is a time between a previous and following reflected sound pulses; and calculating the velocity of the moving objects, wherein a ratio (Rc) of the TOF shift to the emitted period is obtained, the Rc presents a variation of the velocity of the moving objects, which is between positive 1 and negative 1 and equals zero at a baseline, Vobject represents the velocity of the moving objects; an accurate speed of the moving objects cannot be obtained due to lacking information of the TOF and an angle between a sound beam and a direction of the moving objects in the continuous ultrasound:

$$TOF \text{ shift} = \text{emitted period} - \text{reflected period}$$

$$Rc = \frac{TOF \text{ shift}}{\text{emitted period}}$$

$$TOF \text{ shift} = \frac{2 \times V_{objects} \times \text{emitted perior}}{V_m}$$

$$Rc = \frac{2 \times V_{objects}}{V_m}; \text{ and}$$

constructing the sound images of the continuous ultrasound, wherein the sound images of the continuous ultrasound is based on a profile of the Rc or the velocity of the moving objects that pass the sampling points.

7. The method of claim 5, further comprising establishing the sound image for the pulsed ultrasound, which comprising:

setting a gate at a designed location to detect a speed of the moving objects within the gate, wherein the TOF and the TOF shift and the angle between the sound beam and the direction of the moving objects will be obtained to calculate the speed of the moving objects that pass the gate, a size of the gate decides numbers of the sampling pints within the gate;

a calculated TOF is obtained based on the $V_{avg}$ and the detecting depth between the transducer and the gate, a detected TOF is a time between the emitted sound pulses and corresponding reflected sound pulses from the gate, an angle θ is the angle between the sound beam and the direction of the moving objects at the designed sampling points TOF shift=calculated TOF−detected TOF constructing a Rt profile, wherein the Rt is a ratio of the TOF to the calculated TOF; the Rt compensates an effect of changing the detecting depth on a change of the TOF shift; the Rt value is between positive 1 and negative 1 and the Rt equals zero at the baseline $$Rt = \frac{TOF \text{ shift}}{\text{calculated } TOF}; \text{ and}$$

calculating the speed of the moving objects from the Rt, wherein various speed affecting factors containing in the Rt, $V_{avg}$ and angle $\theta$ will improve an accuracy of calculated speed of the moving objects:

$$TOF \text{ shift} = \frac{2 \times V_{objects} \times \text{calculated } TOF \times \cos(\theta)}{V_{avg}}$$

$$Rt = \frac{2 \times V_{objects} \times \cos(\theta)}{V_{avg}}.$$

8. The method of claim 5, further comprising establishing the sound image for the color ultrasound, which comprising:
designing an area to detect the velocity of the moving objects from the sampling points within the designed area, wherein the Rt will be obtained to calculate the velocity of the moving objects from the sampling points within the designed area;
the accurate speed of the moving objects cannot be obtained due to lacking the information of the angle between the sound beam and the direction of the moving objects in the color ultrasound; and
constructing color images for the color ultrasound, wherein setting colors for each of the sampling points within the designed area according to positive or negative Rt, which represent the direction of the moving objects; the Rt is between positive 1, and negative 1, the Rt equals zero at baseline; for forward moving objects, detected TOF is smaller than calculated TOF and the Rt is positive; for reversely moving objects, the detected TOF is greater than the calculated TOF and the Rt is negative $$TOF \text{ shift} = \text{calculated } TOF - \text{detected } TOF$$

$$Rt = \frac{TOF \text{ shift}}{\text{calculated } TOF}$$

$$TOF \text{ shift} = \frac{2 \times V_{objects} \times \text{calculated } TOF}{V_{avg}}$$

$$Rt = \frac{2 \times V_{objects}}{V_{avg}}.$$

9. The method of claim 5, further comprising calculating the speed of the moving objects by simultaneously detecting the TOF shift at same site from two separated PZT elements (A, B), wherein different numbers of the sound pulses are sent from the PZT element A and the PZT element B, which help to obtain their individual detected TOF;
the speed of the moving objects can be calculated based on the values of the TOF, the TOF shifts, and the Vavg, and an angle $\mu$ between two sound beams from the PZT A element to the PZT B element, which improves testing results with accuracy, simplification and reproducibility $$Rt \ A = \frac{\text{calculated } TOF \ A - \text{detected } TOF \ A}{\text{calculated } TOF \ A}$$

$$Rt \ B = \frac{\text{calculated } TOF \ B - \text{detected } TOF \ B}{\text{calculated } TOF \ B}$$

$$Rt \ A = \frac{2 \times V_{objects} \times \cos(\theta)}{V_{avg}}$$

$$Rt \ B = \frac{2 \times V_{objects} \times \cos(\theta + \mu)}{V_{avg}}$$

$$V_{objects} = \frac{V_{avg} \times \sqrt{(Rt \ A)^2 - 2 \times Rt \ A \times Rt \ B \times \cos(\mu) + (Rt \ B)^2}}{2 \times \sin(\mu)}.$$

10. The method of claim 5, further comprising a method to rectify an aliasing for the pulsed or the color ultrasound comprising:
identifying an aliasing Rt, wherein an aliasing limit for the Rt is greater than 0.5; as the Rt excesses its aliasing limit, the Rt is misinterpreted by the sound imaging system to generate the aliasing Rt, the aliasing Rt is on opposite site of the baseline, which represents the moving objects toward an opposite direction; and the aliasing Rt disrupts a continuity of the Rt profile, and a tip of an aliasing Rt profile is toward the baseline;
obtaining a corrected Rt, wherein rectifying the aliasing Rt will correct registration of the Rt after the Rt exceeds the aliasing limit, the tip of a corrected Rt profile is away from the baseline, and the corrected Rt reconstructs the continuation of the Rt profile; and
using the corrected Rt to calculate the speed of the moving objects based on an equation of the corrected Rt.

11. The method of claim 10, further comprising rectifying the aliasing for the forward moving objects for the pulsed ultrasound, which comprising:
identifying the aliasing Rt for the forward moving objects wherein the detected TOF is less than half calculated TOF, which makes the Rt greater than 0.5 and is a positive value; after the Rt excesses the aliasing limit, the sound imaging system misinterprets the Rt by decreasing 1 from the Rt to form the aliasing Rt, which becomes a negative value and below the baseline; and
the aliasing Rt disrupts the continuation of the Rt profile, and the tip of the aliasing Rt profile is toward the baseline; and
rectifying the aliasing Rt wherein as increased Rt closes to the aliasing limit, if the next Rt becomes a negative value, the aliasing Rt is identified; then the sound imaging system will add 1 to the aliasing Rt to reestablish the continuation of the Rt profile corrected $Rt$=aliasing $Rt$+1 using the corrected Rt to calculate the speed of the forward moving objects based on the equation of the corrected Rt $$\text{corrected } Rt = \frac{2 \times V_{objects} \times \cos(\theta)}{V_{avg}}.$$

12. The method of claim 10, further comprising rectifying the aliasing for the reversely moving objects for the pulsed ultrasound, which comprising:
identifying the aliasing Rt for the reversely moving objects wherein the detected TOF is greater than one and half calculated TOF, which makes the Rt greater than 0.5 and is a negative value; after the Rt excesses the aliasing limit, the sound imaging system misinterprets the Rt by adding 1 to the Rt to form the aliasing Rt, which becomes a positive value and above the baseline;

and the aliasing Rt disrupts the continuation of the Rt profile, and the tip of the aliasing Rt profile is toward the baseline;

rectifying the aliasing Rt wherein as the increased Rt closes to the aliasing limit, if the next Rt becomes the positive value, the aliasing Rt is identified; then the sound imaging system will reduce 1 from the aliasing Rt to reestablish the continuation of the Rt profile:

corrected $Rt$=aliasing $Rt$−1 using the corrected Rt to calculate the speed of the reversely moving objects based on the equation of the corrected Rt $$\text{corrected } Rt = \frac{2 \times V_{objects} \times \cos(\theta)}{V_{avg}}.$$

13. The method of claim 10, further comprising a method of differentiating a color of the aliasing from a color of turbulent flows and rectifying the color of the aliasing for the color ultrasound comprising:
   identifying a color of the aliasing, wherein from one color to a edge of another color, the Rt is gradually increased until close to the aliasing limit;
   identifying the Rt for the color of the turbulent flows, wherein from one color to a edge of another color, the value of the Rt is gradually decreased until close to zero; and
   rectifying the color for the color of the aliasing wherein the aliasing Rt is corrected, and the color for the color of the aliasing is corrected based on the corrected Rt.

14. The method of claim 1 further comprising using coded sound pulses to simultaneously obtain the detecting depth and the velocity from the sampling points with motionless/moving objects to constructing the two dimension (2D) and the three dimension (3D) images, which improves temporal resolution of the sound images, the method comprising:
   the transducer containing one pair or more of emitting PZT elements and receiving PZT elements, wherein different numbers of the sound pulses within each pulse duration is assigned to form different pulse characters, a resting period is a time between each adjacent pulse duration; and
   forming an emitted code of the pulse characters, wherein the emitting PZT elements send the coded sound pulses to form the emitted code of the pulse character, which endows each pulse character with an emitted time, and an emitted resting period keeps identical; and
   obtaining the TOF and the TOF shift, wherein the receiving PZT elements receive reflected coded sound pulses and the sound imaging system decodes the reflected coded sound pulses to form a received code of the pulse characters, which is compares with the emitted code of the pulse characters; then the TOF is obtained from a time between the emitted code of the pulse characters and the correspondingly received code of the pulse characters, and the TOF shift is obtained from a time difference between the emitted resting period and the correspondingly received resting period; and
   identifying the sampling points with the motionless objects, wherein the TOF is identical and the TOF shift is zero from the sampling points with the motionless objects; and then the detecting depth of the sampling points with the motionless objects is calculated from the TOF; and
   identifying the sampling points with the moving objects, wherein variable values of the TOF and the TOF shift are obtained from the sampling points with the moving objects; the velocity of the moving objects from the sampling points is calculated with the Rt equation, the detecting depth of the sampling points is calculated based on a sum of the TOF and the TOF shift with the average speed of the sound pulses in the transmitting medium; for the sampling points with the forward moving objects, the TOF shift is positive, which compensates shortened TOF; and for the sampling points with the reversely moving objects, the TOF shift is negative, which offsets elongated TOF; Rco is a ratio of the TOF shift with the emitted resting period; the detecting depth and the velocity of the moving objects at the sampling points can be calculated as following:

$TOF$ shift = emitted resting period − received resting period $$Rco = \frac{TOF \text{ shift}}{\text{emitted resting period}}$$

$$Rc = \frac{2 \times V_{objects}}{V_{avg}}$$

sum of $TOF = TOF + TOF$ shift $$TOFa = \frac{\text{sum of } TOF \times (1 - Coef)}{2 - Coef}$$

Detecting depth = $V_{avg} \times TOFa$.

15. The method of claim 14 further comprising rectifying sound artifacts of the sound images with the code of the sound pulses, wherein by comparing the received code of the pulse characters with the emitted code of the pulse characters, the sampling points that have the identical received code of the pulse characters with the emitted code of the pulse characters will be registered to an area that belong to the PZT elements that emit the code of the pulse characters; as the result, wrong received code of the pulse characters, such as from duplicately reflected sound pulses of a minor image or refracted sound pulses, will be rectified to correct PZT elements and non-coded background signals will be deleted, which improve the sound imaging quality.

16. A method of claim 14 further comprising constructing the 2D images for the motionless and/or the moving objects with the code of the sound pulses, which comprising:
   Multiple pairs of the emitting PZT elements and the receiving PZT elements linear arranged within the transducer, wherein a 2D dataset (x, y, v) will be obtained, the x represents the linear location of the PZT elements within the transducer, the y represents the detecting depth of the sampling points, and the v represents the velocity of the moving objects that pass the sampling points; and
   constructing the 2D images with the 2D dataset, wherein the x and the y decide a location of the sampling points in the 2D images, and the v decides colors that are related to the velocity of the moving objects at the sampling points.

17. A method of claim 14, further comprising constructing the 3D images for the motionless and/or the moving objects with the coded sound pulses, which comprising:

obtaining a 3D dataset (x, y, z, v) of three orthogonal axes from a plurality of succession of the 2D dataset, wherein a value of the z represents a position of the sampling points in a volumetric image array from the plurality of the succession of the 2D dataset; and constructing the 3D images based on the 3D dataset (x, y, z, v) with related computer programs, which comprising:

(1) constructing a 3D image just with the sampling points of the moving objects, wherein the 3D image clearly presents a volumetric information of vessels with the velocity of the moving objects within the vessels; or (2) constructing a 3D image just with the sampling points with the motionless objects, wherein the 3D image presents solid parts of a target organ; or (3) constructing a compound 3D image wherein the compound 3D image contains the sampling points with the motionless objects and the moving objects, the colors are used to represent the velocity of the moving objects at the sampling points.

18. A method of claim 14, further comprising improving the temporal resolution with the coded sound pulses, wherein continuously emitting and receiving the coded sound pulses decrease a time from the beginning of one frame to the next one, which improve the ability of the sound imaging system to distinguish between instantaneous events of fast moving objects.

* * * * *